United States Patent

(12) United States Patent
Okoshi et al.

(10) Patent No.: US 7,353,094 B2
(45) Date of Patent: Apr. 1, 2008

(54) ELECTRICALLY OPERATED VEHICLE DRIVING CONTROLLER, ELECTRICALLY OPERATED VEHICLE DRIVING CONTROL METHOD AND ITS PROGRAM

(75) Inventors: Toshio Okoshi, Anjo (JP); Ken Iwatsuki, Anjo (JP); Taketo Takeuchi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 739 days.

(21) Appl. No.: 10/851,206

(22) Filed: May 24, 2004

(65) Prior Publication Data

US 2004/0249518 A1      Dec. 9, 2004

(30) Foreign Application Priority Data

Jun. 6, 2003    (JP) .............................. 2003-162383

(51) Int. Cl.
      *G06F 19/00*    (2006.01)
(52) U.S. Cl. ................. 701/22; 180/65.1; 180/65.8
(58) Field of Classification Search ............. 701/22; 180/65.1–65.5, 65.8
See application file for complete search history.

(56) References Cited

U.S. PATENT DOCUMENTS 5,549,172 A * 8/1996 Mutoh et al. ............... 180/65.1
6,960,152 B2 * 11/2005 Aoki et al. ..................... 477/3
7,019,472 B2 * 3/2006 Kayukawa et al. ......... 318/139
7,117,071 B2 * 10/2006 Aoki et al. ................... 701/22

FOREIGN PATENT DOCUMENTS

| JP | A-09-191582  | 7/1997 |
| JP | A 2000-184502 | 6/2000 |
| JP | A-2001-177909 | 6/2001 |
| JP | A 2003-111206 | 4/2003 |

* cited by examiner

*Primary Examiner*—Gary Chin
(74) *Attorney, Agent, or Firm*—Oliff & Berridge, PLC

(57) ABSTRACT

An electrically operated vehicle driving controller has an electrically operated machine driving section for operating an electrically operated machine; a driving section temperature detecting section for detecting the driving section temperature of the electrically operated machine driving section; a limit ratio calculating processor for calculating a limit ratio for limiting the torque of the electrically operated machine on the basis of the driving section temperature; a rotating speed calculating processor for calculating the rotating speed of the electrically operated machine; and a limit torque calculating processor for calculating an electrically operated machine limit torque corresponding to an electrically operated machine maximum torque set corresponding to the rotating speed on the basis of the limit ratio. Because the torque of the electrically operated machine is limited in a limit ratio corresponding to the temperature of the electrically operated machine, it is possible to prevent the characteristics of the electrically operated machine from being reduced.

13 Claims, 21 Drawing Sheets

ELECTRICALLY OPERATED VEHICLE DRIVING CONTROLLER, ELECTRICALLY OPERATED VEHICLE DRIVING CONTROL METHOD AND ITS PROGRAM

This application claims priority from JP 2003-162383, filed Jun. 6, 2003, the entire contents of which are incorporated herein by reference thereto.

BACKGROUND OF THE INVENTION

1. Field of Invention

The invention relates to an electrically operated vehicle driving controller, an electrically operated vehicle driving control method and its program.

2. Description of Related Art

In a vehicle drive unit mounted to an electric automobile as an electrically operated vehicle and generating the torque of a drive motor, as an electrically operated machine, i.e., drive motor torque and transmitting the drive motor torque to a drive wheel, the drive motor is conventionally operated by receiving a direct electric current from a battery at a power applying (driving) time and generates the drive motor torque. At a regenerative time (electricity generating) time, the drive motor generates the direct electric current by receiving torque by inertia of the electric automobile and supplies this electric current to the battery.

Further, a planetary gear unit having a sun gear, a ring gear and a carrier is arranged in a vehicle drive unit, mounted to a hybrid type vehicle, as an electrically operated vehicle, and transmits the torque of an engine, i.e., one portion of the engine torque to an electric generator (electric generator motor) as a first electrically operated machine and also transmits the remaining engine torque to a drive wheel. The above carrier and the engine are connected to each other. The ring gear, the drive motor, as a second electrically operated machine, and the drive wheel are connected to each other. The sun gear and the electric generator are connected to each other. Rotations outputted from the above ring gear and the drive motor are transmitted to the drive wheel so that a driving force is generated.

In each of the above vehicle drive units, an inverter is arranged between the drive motor and a drive motor controller. The inverter is operated by a driving signal sent from the drive motor controller and generates the electric currents of U, V and W phases by receiving the direct electric current from the battery and supplies the electric current of each phase to the drive motor. Therefore, the inverter has plural transistors, such as six transistors as switching elements, and each transistor is formed as a unit every one pair and constitutes a transistor module (IGBT) of each phase. Accordingly, when the driving signal is sent to each transistor in a predetermined pattern, the transistor is turned on and off and the electric current of each phase is generated.

The rotating speed of the drive motor, i.e., the drive motor rotating speed, is detected by a drive motor rotating speed sensor. For example, drive motor torque in the drive motor, etc. are controlled on the basis of the drive motor rotating speed.

As the electric generator, the drive motor, etc. are operated, the coil of a stator is heated and the temperatures of the electric generator, the drive motor, etc. are raised so that the characteristics of the electric generator, the drive motor, etc. are reduced.

Therefore, the drive motor rotating speed and the temperature of the drive motor are detected and drive motor target torque, showing a target value of the drive motor torque, is multiplied by a predetermined ratio corresponding to the drive motor rotating speed and the temperature of the drive motor so as to limit the drive motor torque, e.g., as described in JP-A-2000-18402.

However, in the conventional vehicle drive unit, the drive motor target torque is uniformly multiplied by the above ratio when the drive motor torque is limited. Therefore, there is a case in which no drive motor torque can be sufficiently generated and an output required by a driver, i.e., a driver requested output, cannot be sufficiently generated.

SUMMARY OF THE INVENTION

An object of the invention is to provide an electrically operated vehicle driving controller, an electrically operated vehicle driving control method and its program able to sufficiently generate the driver request output by solving the above problems of the conventional vehicle drive unit.

Therefore, the electrically operated vehicle driving controller of the invention comprises an electrically operated machine driving section for operating an electrically operated machine; a driving section temperature detecting section for detecting the driving section temperature of the electrically operated machine driving section; limit ratio calculation processing means for calculating a limit ratio for limiting the torque of the electrically operated machine on the basis of the driving section temperature; rotating speed calculation processing means for calculating the rotating speed of the electrically operated machine; and limit torque calculation processing means for calculating an electrically operated machine limit torque corresponding to an electrically operated machine maximum torque set corresponding to the rotating speed on the basis of the limit ratio.

Another electrically operated vehicle driving controller of the invention further comprises electrically operated machine target torque calculation processing means for calculating an electrically operated machine target torque showing a target value of the electrically operated machine torque, and correcting torque calculation processing means for correcting the electrically operated machine target torque on the basis of the electrically operated machine limit torque.

In still another electrically operated vehicle driving controller of the invention, the limit ratio is gradually relaxed such that the torque of the electrically operated machine approaches the electrically operated machine maximum torque when the rotating speed belongs to a predetermined low speed rotation area.

In still another electrically operated vehicle driving controller of the invention, the limit ratio is relaxed such that the torque of the electrically operated machine approaches the electrically operated machine maximum torque in a constant changing ratio when the rotating speed belongs to a predetermined low speed rotation area.

In still another electrically operated vehicle driving controller of the invention, the electrically operated machine limit torque is increased as the rotating speed is reduced, and is decreased as the rotating speed is increased.

In the electrically operated vehicle driving control method of the invention, the driving section temperature of an electrically operated machine driving section for operating an electrically operated machine is detected, and a limit ratio for limiting the torque of the electrically operated machine is calculated on the basis of the driving section temperature, and the rotating speed of the electrically operated machine is calculated, and an electrically operated machine limit torque corresponding to the electrically operated machine maximum torque set corresponding to the rotating speed is calculated on the basis of the limit ratio.

In the program of the electrically operated vehicle driving control method of the invention, a computer functions as limit ratio calculation processing means for calculating a limit ratio for limiting the torque of an electrically operated machine on the basis of the driving section temperature of an electrically operated machine driving section, rotating speed calculation processing means for calculating the rotating speed of the electrically operated machine, and limit torque calculation processing means for calculating the electrically operated machine limit torque corresponding to the electrically operated machine maximum torque set corresponding to the rotating speed on the basis of the limit ratio.

BRIEF DESCRIPTION OF THE DRAWINGS

The invention will be described with reference to the drawings, in which.

DETAILED DESCRIPTION OF PREFERRED EMBODIMENTS

Figure 1:
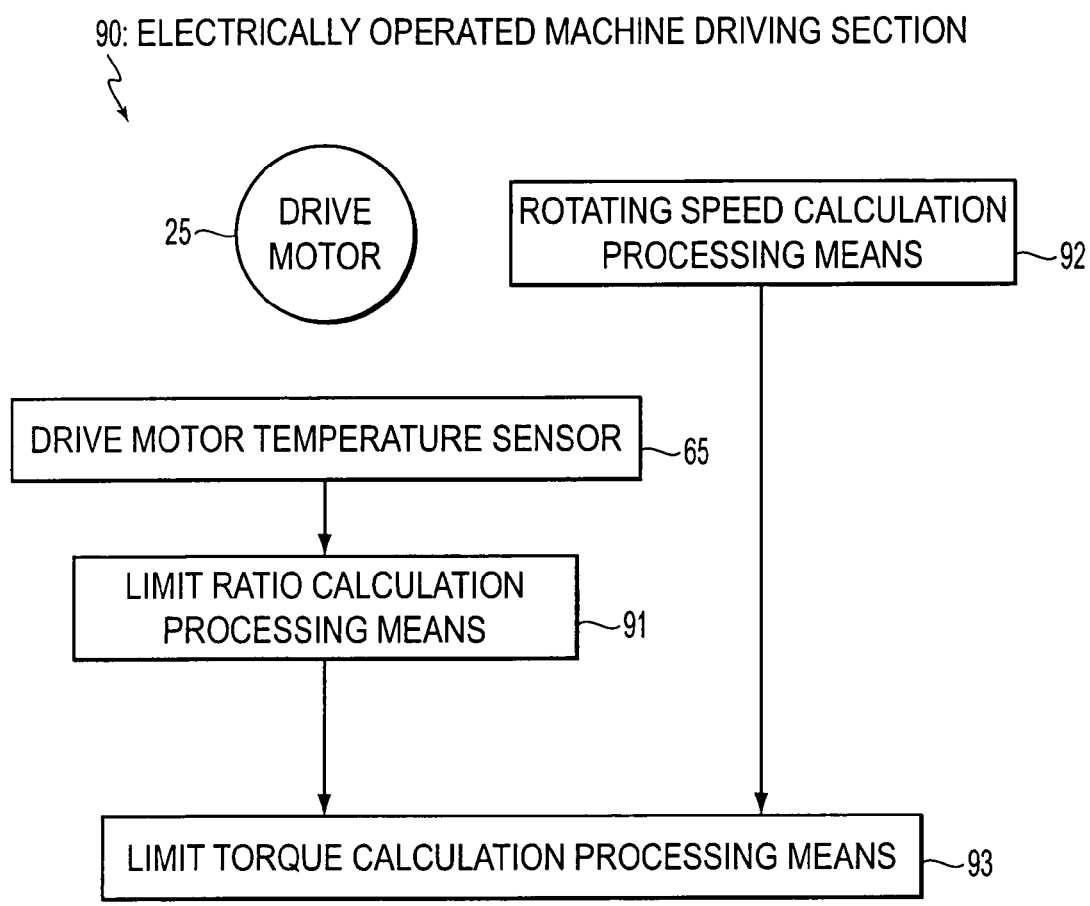
FIG. 1 is a functional block diagram of an electrically operated vehicle driving controller in a first form of the invention.

FIG. 1 is a functional block diagram of an electrically operated vehicle driving controller in the first form of the invention. In the figure, reference numeral 90 designates an electrically operated machine driving section for operating a drive motor 25 as a second electrically operated machine. Reference numeral 65 designates a drive motor temperature sensor as a driving section temperature detecting section for detecting the driving section temperature of the electrically operated machine driving section 90. Reference numeral 91 designates a limit ratio calculation processing means for calculating a limit ratio for limiting drive motor torque TM on the basis of the above driving section temperature. Reference numeral 92 designates a rotating speed calculation processing means for calculating a drive motor rotating speed NM. Lastly, reference numeral 93 designates a limit torque calculation processing means for calculating drive motor limit torque TMi corresponding to drive motor maximum torque TMmax set corresponding to the drive motor rotating speed NM on the basis of the limit ratio.

Next, a hybrid type vehicle, as an electrically operated vehicle, having an engine, an electric generator and the drive motor will be explained. The invention can be also applied to an electric automobile having no engine and no electric generator and having only the drive motor, and a hybrid vehicle of a parallel type having no electric generator and having the engine and the drive motor as the electrically operated vehicle instead of the above hybrid type vehicle.

Figure 2:
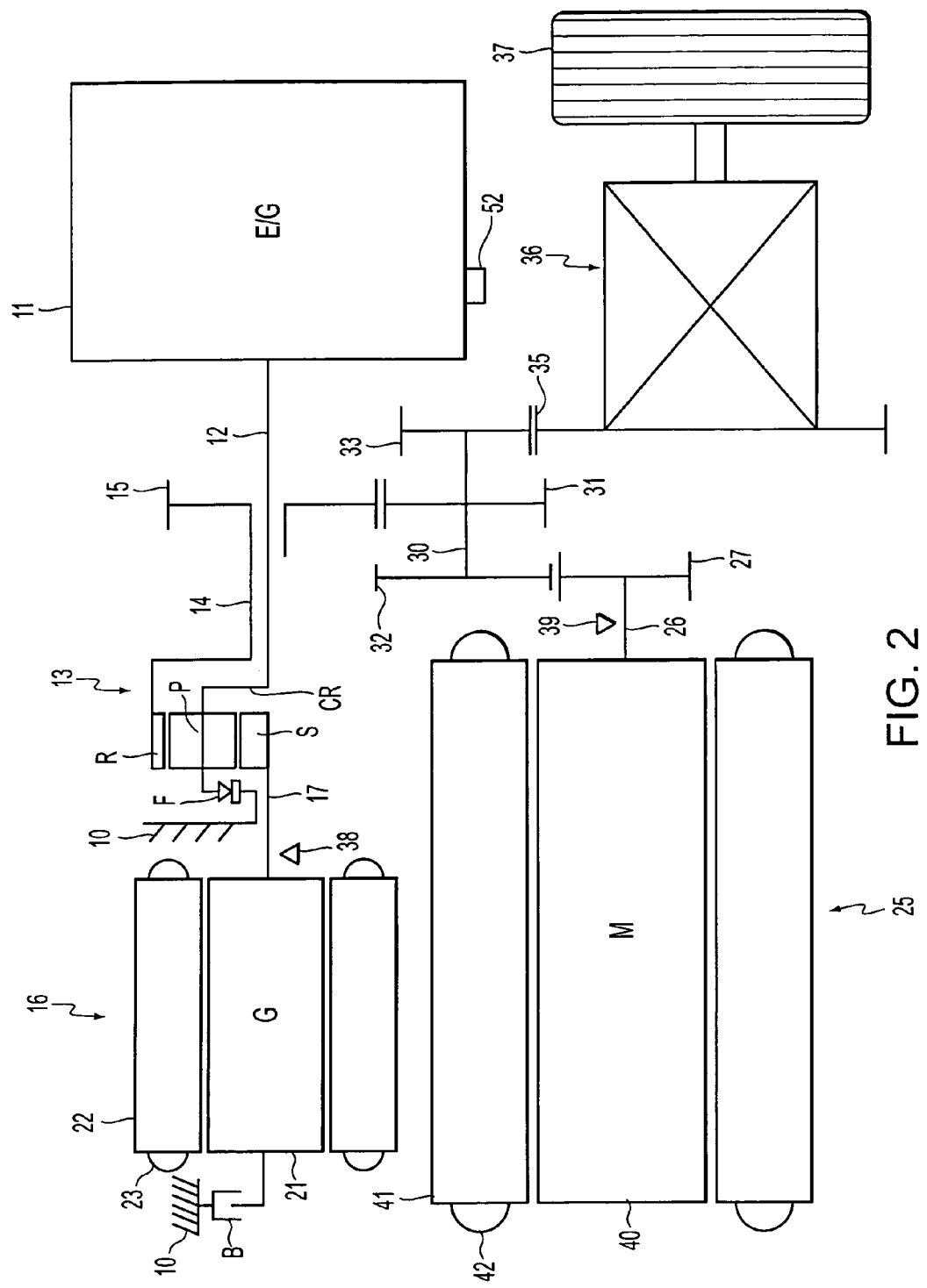
FIG. 2 is a conceptual view of the hybrid type vehicle in the first form of the invention.
Figure 3:
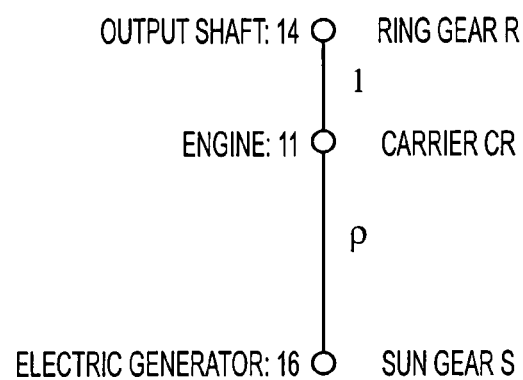
FIG. 3 is a view for explaining the operation of a planetary gear unit in the first form of the invention.

FIG. 2 is a conceptual view of the hybrid type vehicle in the first form of the invention. In FIG. 2, reference numerals 11, 12 respectively designate an engine (E/G) arranged on a first axial line, and an output shaft. The output shaft 12 is arranged on the first axial line, and outputs rotation generated by operation of the engine 11. Reference numeral 13 designates a planetary gear unit, as a differential device, arranged on the first axial line for making a speed change with respect to the rotation inputted through the output shaft 12. Reference numeral 14 designates an output shaft arranged on the first axial line. The rotation, after the speed change in the above planetary gear unit 13, is outputted to the output shaft 14. Reference numeral 15 designates a first counter drive gear as an output gear fixed to the output shaft 14. Reference numeral 16 designates an electric generator (G), as a first electrically operated machine, arranged on the first axial line and connected to the planetary gear unit 13 through a transmission shaft 17. The electric generator 16 is mechanically connected to the engine 11 so as to be differentially freely rotated. Further, the electric generator 16 is mechanically connected to the drive wheel 37 which is a vehicle wheel.

The output shaft 14 has a sleeve shape and is arranged so as to surround the output shaft 12. Further, the first counter drive gear 15 is arranged on the engine 11 side of the planetary gear unit 13.

The planetary gear unit 13 has, at least, a sun gear S as a first differential element, a pinion P engaged with the sun gear S, a ring gear R as a second differential element engaged with the pinion P, and a carrier CR as a third differential element for rotatably supporting the pinion P. The sun gear S is connected to the electric generator 16 by the transmission shaft 17. The ring gear R is connected to the drive wheel 37 and a drive motor (M) 25, as a second electrically operated machine, through the output shaft 14 and a predetermined gear series. The drive motor 25 is differentially rotatably and mechanically connected to the engine 11 and the electric generator 16. The drive motor 25 is arranged on a second axial line parallel to the first axial line. The carrier CR is connected to the engine 11 through the output shaft 12. The drive motor 25 is mechanically connected to the drive wheel 37. A one-way clutch F is arranged between the carrier CR and a case 10 of a hybrid type vehicle drive unit as a vehicle drive unit. The one-way clutch F is free when the rotation in the normal direction is transmitted from the engine 11 to the carrier CR. The one-way clutch F is locked when the rotation in the reverse direction is transmitted from the electric generator 16 or the drive motor 25 to the carrier CR. Thus, the rotation of the engine 11 is stopped and no rotation in the reverse direction is transmitted to the engine 11. Accordingly, when the electric generator 16 is operated in a state in which the driving of the engine 11 is stopped, reaction force is applied to the torque transmitted from the electric generator 16 by the one-way clutch F. A brake (not shown), as a stopping means, can also be arranged, instead of the one-way clutch F, between the carrier CR and the case 10.

The electric generator 16 comprises a rotor 21 fixed to the transmission shaft 17 for rotation, a stator 22 arranged around the rotor 21, and a coil 23 wound around the stator 22. The electric generator 16 generates electric power by the rotation transmitted through the transmission shaft 17. The coil 23 is connected to a battery (not shown), and a direct electric current is supplied to the battery. An electric generator brake B is arranged between the rotor 21 and the case 10. The rotor 21 is fixed by engaging the electric generator brake B. Thus, rotation of the electric generator 16 can be mechanically stopped.

Reference numeral 26 designates an output shaft arranged on the second axial line. The rotation of the drive motor 25 is outputted to the output shaft 26. Reference numeral 27 designates a second counter drive gear as an output gear fixed to the output shaft 26. The drive motor 25 comprises a rotor 40 fixed to the output shaft 26 for rotation, a stator 41 arranged around the rotor 40, and a coil 42 wound around the stator 41.

The drive motor 25 generates drive motor torque TM by the electric currents of U, V and W phases as an alternating electric current supplied to the coil 42. Therefore, the coil 42 is connected to the battery, and the direct electric current from the battery is converted into the electric current of each phase and is supplied to the coil 42.

A counter shaft 30 is arranged on a third axial line parallel to the first and second axial lines to rotate the drive wheel 37 in the same direction as the rotation of the engine 11. A first counter driven gear 31 and a second counter driven gear 32, having a tooth number larger than that of the first counter driven gear 31, are fixed to the counter shaft 30. The first counter driven gear 31 and the first counter drive gear 15 are engaged with each other. The second counter driven gear 32 and the second counter drive gear 27 are engaged with each other. The rotation of the first counter drive gear 15 is inverted and transmitted to the first counter driven gear 31. The rotation of the second counter drive gear 27 is inverted and transmitted to the second counter driven gear 32.

Further, a diff-pinion gear 33 having a tooth number smaller than that of the first counter driven gear 31 is fixed to the counter shaft 30.

A differential device 36 is arranged on a fourth axial line parallel to the first to third axial lines, and a diff-ring gear 35, of the differential device 36, and the diff-pinion gear 33 are engaged with each other. Accordingly, the rotation transmitted to the diff-ring gear 35 is distributed by the above differential device 36 and is transmitted to the drive wheel 37. Thus, the rotation generated by the engine 11 can be transmitted to the first counter driven gear 31, and the rotation generated by the drive motor 25 can be transmitted to the second counter driven gear 32. Accordingly, the hybrid type vehicle can run by operating the engine 11 and the drive motor 25.

Reference numeral 38 designates an electric generator rotor position sensor, such as a resolver, for detecting the position of the rotor 21, i.e., an electric generator rotor position $\theta G$. Reference numeral 39 designates a drive motor rotor position sensor, such as a resolver, for detecting the position of the rotor 40, i.e., a drive motor rotor position $\theta M$. The detected electric generator rotor position $\theta G$ is sent to vehicle controller (not shown in FIG. 2) and an electric generator controller (not shown in FIG. 2). The drive motor rotor position $\theta M$ is sent to the vehicle controller and a drive motor controller (not shown in FIG. 2). Further, reference numeral 52 designates an engine rotating speed sensor, as an engine rotating speed detecting section, for detecting the rotating speed of the engine 11, i.e., the engine rotating speed NE. The engine rotating speed NE is sent to the vehicle controller and an engine controller (not shown in FIG. 2).

The operation of the planetary gear unit 13 will next be explained.

In the above planetary gear unit 13 (FIG. 2), the carrier CR is connected to the engine 11, the sun gear S is connected to the electric generator 16, and the ring gear R is connected to each of the drive motor 25 and the drive wheel 37 through the output shaft 14 and a predetermined gear series. Accordingly, the rotating speed of the ring gear R, i.e., a ring gear rotating speed NR, and the rotating speed outputted to the output shaft 14, i.e., an output shaft rotating speed are equal to each other. The rotating speed of the carrier CR and the engine rotating speed NE are equal to each other. Further, the rotating speed of the sun gear S and the rotating speed of the electric generator 16, i.e., the electric generator rotating speed NG, as a first electrically operated machine, are equal to each other. When the tooth number of the ring gear R is set to p times (twice in this form of the invention) the tooth number of the sun gear S, the relationship of $$(\rho+1)\cdot NE = 1\cdot NG + \rho \cdot NR$$

is formed. Accordingly, the engine rotating speed NE, $$NE = (1\cdot NG + \rho \cdot NR)/(\rho+1) \qquad (1),$$

can be calculated on the basis of the ring gear rotating speed NR and the electric generator rotating speed NG. The rotating speed relation formula of the planetary gear unit 13 is structured by formula (1).

The engine torque TE, torque generated in the ring gear R, i.e., ring gear torque TR and the torque of the electric generator 16, i.e., electric generator torque TG, as first electrically operated machine torque, have the following relationship:

$$TE:TR:TG=(\rho+1):\rho:1 \qquad (2),$$

so that reaction forces are applied to each other. The torque relation formula of the planetary gear unit 13 is structured by formula (2).

Figure 4:
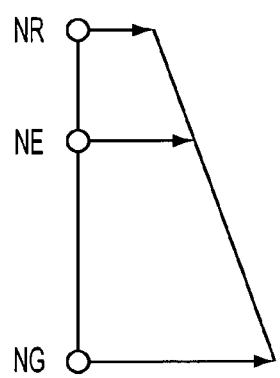
FIG. 4 is a vehicle speed diagram at a normal running time in the first form of the invention.
Figure 5:
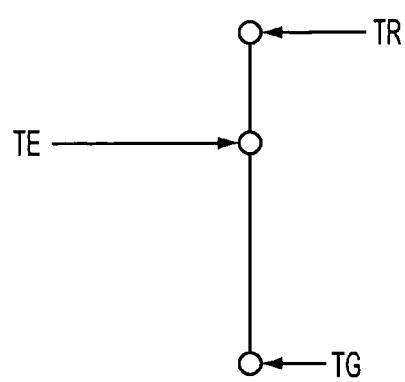
FIG. 5 is a torque diagram at the normal running time in the first form of the invention.

At the normal running time of the hybrid type vehicle, each of the ring gear R, the carrier CR and the sun gear S is rotated in the normal direction, and each of the ring gear rotating speed NR, the engine rotating speed NE and the electric generator rotating speed NG has a positive value as shown in FIG. 4. Further, the ring gear torque TR and the electric generator torque TG are obtained by proportionally dividing the engine torque TE in a torque ratio determined by the tooth number of the planetary gear unit 13. Accordingly, in the torque diagram shown in FIG. 5, torque provided by adding the ring gear torque TR and the electric generator torque TG becomes the engine torque TE.

The hybrid type vehicle driving controller, as an electrically operated vehicle driving controller, for controlling the operation of the above hybrid type vehicle drive unit will next be explained.

Figure 6:
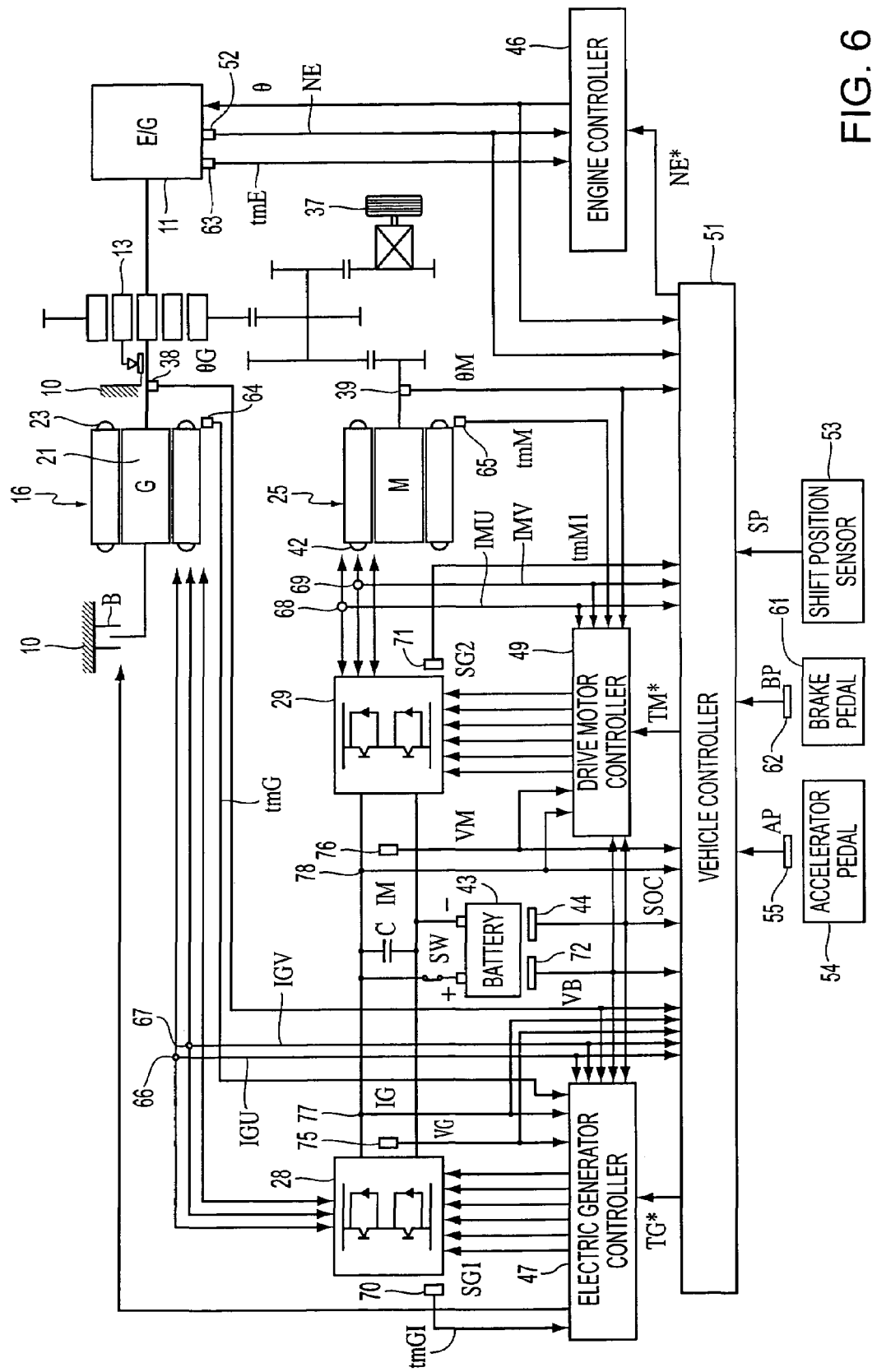
FIG. 6 is a conceptual view of the hybrid type vehicle driving controller in the first form of the invention.

FIG. 6 is a conceptual view of the hybrid type vehicle driving controller in the first form of the invention. In the figure, reference numerals 10, 11, 13 respectively designate the case, the engine (E/G), and the planetary gear unit. Reference numerals 16, B, 25 respectively designate the electric generator (G), the electric generator brake for fixing the rotor 21 of the electric generator 16, and the drive motor (M). Reference numerals 28, 29, 37 respectively designate an electric generator inverter for operating the electric generator 16, a drive motor inverter for driving the drive motor 25, and the drive wheel. Reference numerals 38, 39, 43 respectively designate an electric generator rotor position sensor, a drive motor rotor position sensor, and a battery. The inverters 28, 29 are connected to the battery 43 through a power switch SW. The battery 43 supplies a direct electric current to the inverters 28, 29 when the power switch SW is turned on. Each of the inverters 28, 29 has plural transistors, such as six transistors, as switching elements, and each transistor is formed as a unit every one pair and constitutes a transistor module (IGBT) of each phase.

An electric generator inverter voltage sensor 75, as a first direct electric current voltage detecting section, is arranged on the inlet side of the inverter 28 to detect a direct electric voltage applied to the inverter 28, i.e., an electric generator inverter voltage VG. An electric generator inverter electric current sensor 77, as a first direct electric current detecting section, is arranged to detect the direct electric current supplied to the inverter 28, i.e., an electric generator inverter electric current IG. Further, a drive motor inverter voltage sensor 76, as a second direct electric voltage detecting section, is arranged on the inlet side of the inverter 29 to detect the direct electric voltage applied to the inverter 29, i.e., a drive motor inverter voltage VM. A drive motor inverter electric current sensor 78, as a second direct electric current detecting section, is arranged to detect the direct electric current supplied to the inverter 29, i.e., a drive motor inverter electric current IM. The electric generator inverter voltage VG and the electric generator inverter electric current IG are sent to a vehicle controller 51 and an electric generator controller 47. The drive motor inverter voltage VM and the drive motor inverter electric current IM are sent to the vehicle controller 51 and a drive motor controller 49. A capacitor C, for smoothing, is connected between the battery 43 and the inverters 28, 29. The vehicle controller 51 includes a CPU, recorder, etc. (not shown) and controls the operation of the entire hybrid type vehicle driving controller, and functions as a computer in accordance with predetermined programs, data, etc. An engine controller 46, the electric generator controller 47 and the drive motor controller 49 are connected to the vehicle controller 51. The engine controller 46 includes a CPU, recorder, etc. (not shown), and sends instruction signals for a throttle aperture θ, valve timing, etc. to the engine 11 and the vehicle controller 51 so as to control the operation of the engine 11. The electric generator controller 47 includes a CPU, recorder, etc. (not shown), and sends a driving signal SG1 to the inverter 28 so as to control the operation of the electric generator 16. The drive motor controller 49 includes a CPU, recorder, etc. (not shown), and sends a driving signal SG2 to the inverter 29 so as to control the operation of the drive motor 25. A first controller subordinate to the vehicle controller 51 includes the engine controller 46, the electric generator controller 47 and the drive motor controller 49. A second controller superior to the engine controller 46, the electric generator controller 47 and the drive motor controller 49 comprises the vehicle controller 51. Further, the engine controller 46, the electric generator controller 47 and the drive motor controller 49 also function as a computer in accordance with predetermined programs, data, etc.

The inverter 28 is operated by the driving signal SG1, and generates electric currents IGU, IGV, IGW of respective phases by receiving the direct electric current from the battery 43 at a power applying time. The inverter 28 further supplies the electric currents IGU, IGV, IGW of the respective phases to the electric generator 16. Further, the inverter 28 receives the electric currents IGU, IGV, IGW of the respective phases from the electric generator 16 at a regenerative time, and generates and supplies the direct electric current to the battery 43.

The inverter 29 is operated in accordance with the driving signal SG2, and generates electric currents IMU, IMV, IMW of respective phases by receiving the direct electric current from the battery 43 at the power applying time. The inverter 29 further supplies the electric currents IMU, IMV, IMW of the respective phases to the drive motor 25. Further, the inverter 29 receives the electric currents IMU, IMV, IMW of the respective phases from the drive motor 25 at the regenerative time, and generates and supplies the direct electric current to the battery 43.

Reference numeral 44 designates a battery remaining amount detector for detecting a state of the battery 43, i.e., the battery remaining amount SOC as the battery state. Reference numerals 52, 53, 54 respectively designate an engine rotating speed sensor for detecting the engine rotating speed NE, a shift position sensor for detecting the position of a shift lever (not shown), as a selecting speed operating means, i.e., a shift position SP, and an accelerator pedal. Reference numeral 55 designates an accelerator switch, as an accelerator operation detecting section for detecting the position (stepping-on amount) of the accelerator pedal 54, i.e., an accelerator pedal position AP. Reference numerals 61, 62 respectively designate a brake pedal and a brake switch, as a brake operation detecting section for detecting the position (stepping-on amount) of the brake pedal 61, i.e., a brake pedal position BP. Reference numerals 63, 64 respectively designate an engine temperature sensor for detecting the temperature tmE of the engine 11, and an electric generator temperature sensor for detecting the temperature of the electric generator 16, e.g., the temperature tmG of the coil 23 (FIG. 2). Reference numeral 65 designates a drive motor temperature sensor for detecting the temperature of the drive motor 25, e.g., the temperature tmM of the coil 42. Reference numerals 70, 71 respectively designate a first inverter temperature sensor for detecting the temperature tmGI of the inverter 28, and a second inverter temperature sensor for detecting the temperature tmMI of the inverter 29.

A first electrically operated machine driving section of the electrically operated machine driving section 90 (FIG. 1) includes the electric generator 16 and the inverter 28. A second electrically operated machine driving section of the electrically operated machine driving section 90 includes the drive motor 25 and the inverter 29. Temperatures tmG, tmGI, etc. are detected as the temperature of the first electrically operated machine driving section, i.e., a first driving section temperature. The temperatures tmM, tmMI, etc. are detected as the temperature of the second electrically operated machine driving section, i.e., a second driving section temperature. The temperatures tmG, tmGI, etc. are sent to the electric generator controller 47, and the temperatures tmM, tmMI, etc. are sent to the drive motor controller 49. Further, the temperature tmO of oil for cooling the electric generator 16 and the drive motor 25 can be also detected by an oil temperature sensor (not shown) as the driving section temperature common to the respective first and second electrically operated machine driving sections. A first driving section temperature detecting section is comprised of the electric generator temperature sensor 64, the first inverter temperature sensor 70, the oil temperature sensor, etc. A second driving section temperature detecting section comprises the drive motor temperature sensor 65, the second inverter temperature sensor 71, the oil temperature sensor, etc.

Further, reference numerals 66 to 69 respectively designate electric current sensors as an alternating electric current detecting section for detecting electric currents IGU, IGV, IMU, IMV of the respective phases. Reference numeral 72 designates a battery voltage sensor, as a voltage detecting section, for the battery 43 for detecting the battery voltage VB as the battery state. The battery voltage VB and the battery remaining amount SOC are sent to the electric generator controller 47, the drive motor controller 49 and the vehicle controller 51. Further, the battery electric current, the battery temperature, etc. can be also detected as the battery state. A battery state detecting section includes the battery remaining amount detector 44, the battery voltage sensor 72, a battery electric current sensor (not shown), a battery temperature sensor (not shown), etc. Further, the electric currents IGU, IGV are sent to the electric generator controller 47 and the vehicle controller 51. The electric currents IMW, IMV are sent to the drive motor controller 49 and the vehicle controller 51.

The vehicle controller 51 sends an engine control signal to the engine controller 46, and sets the starting and stoppage of the engine 11 by the engine controller 46. Further, a vehicle speed calculation processing means (not specifically shown) of the vehicle controller 51 performs vehicle speed calculation processing, and calculates a changing ratio ΔθM of the drive motor rotor position θM, and also calculates a vehicle speed V on the basis of the changing ratio ΔθM and a gear ratio γV in a torque transmission system from the output shaft 26 to the drive wheel 37.

The vehicle controller 51 sets an engine target rotating speed NE* as a target value of the engine rotating speed NE, an electric generator target torque TG* as a first electrically operated machine target torque as a target value of the electric generator torque TG, and drive motor target torque TM* as a second electrically operated machine target torque as a target value of the drive motor torque TM. The electric generator controller 47 sets an electric generator target rotating speed NG* as a first electrically operated machine target rotating speed as a target value of the electric generator rotating speed NG. The drive motor controller 49 sets a drive motor torque correcting value δTM as a correcting value of the drive motor torque TM. A control command value is produced from the engine target rotating speed NE*, the electric generator target torque TG*, the drive motor target torque TM*, etc.

An electric generator rotating speed calculation processing means (not specifically shown) of the electric generator controller 47 performs electric generator rotating speed calculation processing, reads the electric generator rotor position θG, and calculates the electric generator rotating speed NG by calculating a changing ratio ΔθG of the electric generator rotor position θG.

A drive motor rotating speed calculation processing means (not specifically shown) of the drive motor controller 49 performs drive motor rotating speed calculation processing, reads the drive motor rotor position θM, and calculates a drive motor rotating speed NM as a second electrically operated machine rotating speed by calculating a changing ratio ΔθM of the drive motor rotor position θM.

The electric generator rotor position θG and the electric generator rotating speed NG are proportional to each other. Further, the drive motor rotor position θM, the drive motor rotating speed NM and the vehicle speed V are proportional to each other. Accordingly, the electric generator rotor position sensor 38 and the electric generator rotating speed calculation processing means can function as an electric generator rotating speed detecting section for detecting the electric generator rotating speed NG. The drive motor rotor position sensor 39 and the drive motor rotating speed calculation processing means can function as a drive motor rotating speed detecting section for detecting the drive motor rotating speed NM. The drive motor rotor position sensor 39 and the vehicle speed calculation processing means can function as a vehicle speed detecting section for detecting the vehicle speed V. Further, the rotating speed detecting section includes the electric generator rotor position sensor 38 and the drive motor rotor position sensor 39. The rotating speed calculation processing means 92 comprises the electric generator rotating speed calculation processing means and the drive motor rotating speed calculation processing means. The rotating speed calculation processing includes the electric generator rotating speed calculation processing and the drive motor rotating speed calculation processing.

In this form, the engine rotating speed NE is detected by the engine rotating speed sensor 52, but can be calculated in the engine controller 46. Further, in this form, the vehicle speed V is calculated by the vehicle speed calculation processing means on the basis of the drive motor rotor position θM. However, the vehicle speed V can also be calculated on the basis of the ring gear rotating speed NR, by detecting the ring gear rotating speed NR, and can also be calculated on the basis of the rotating speed of the drive wheel 37, i.e., a drive wheel rotating speed. In this case, a ring gear rotating speed sensor, a drive wheel rotating speed sensor, etc. comprise a vehicle speed detecting section.

Figure 10:
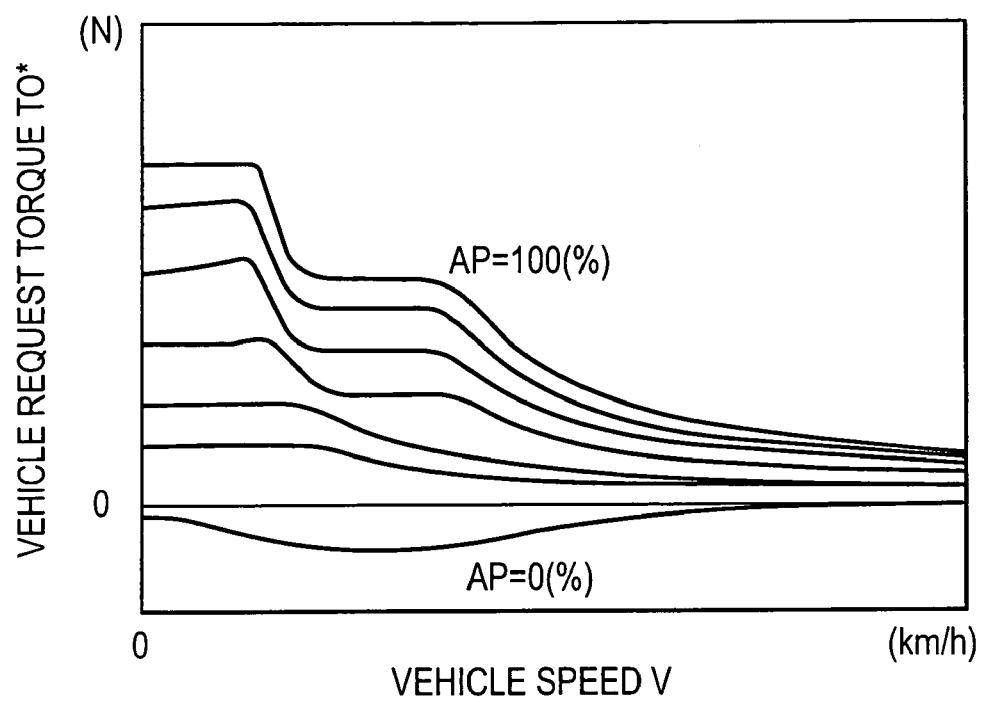
FIG. 10 illustrates a first vehicle request torque map in the first form of the invention.
Figure 11:
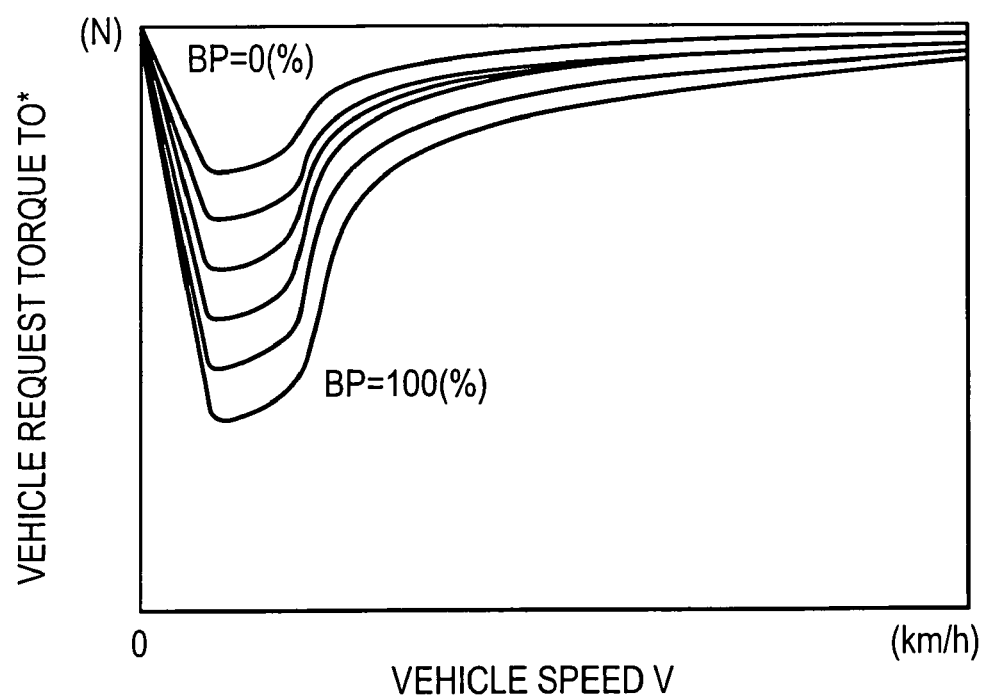
FIG. 11 illustrates a second vehicle request torque map in the first form of the invention.
Figure 12:
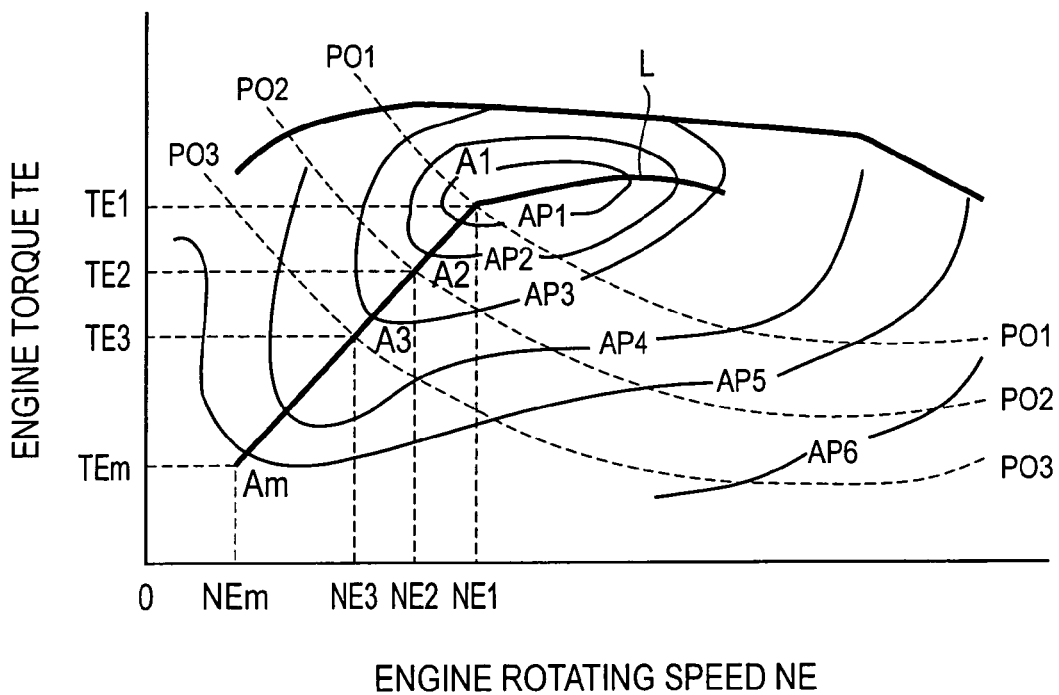
FIG. 12 illustrates an engine target operating state map in the first form of the invention.
Figure 13:
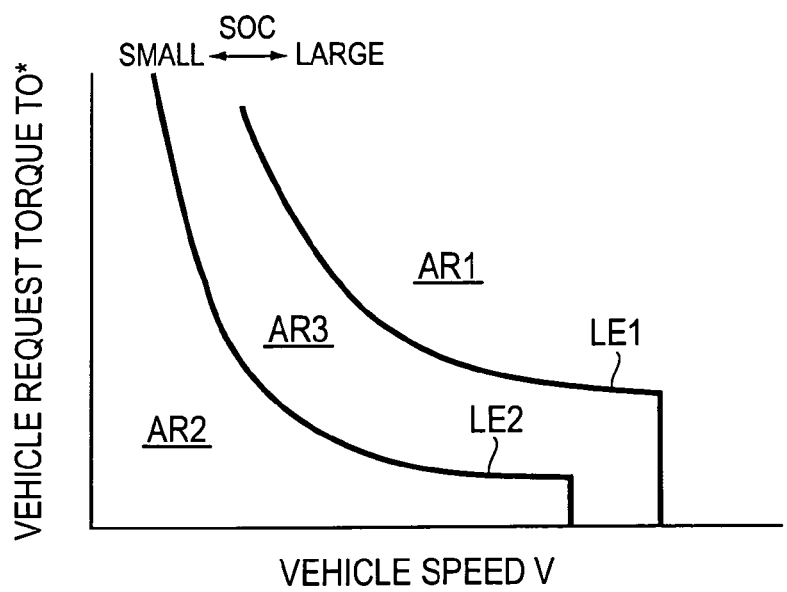
FIG. 13 illustrates an engine driving area map in the first form of the invention.

Operation of the hybrid type vehicle driving controller of the above structure will next be explained with reference to FIGS. 7-13. In FIGS. 10, 11 and 13, the vehicle speed V is set on the abscissa axis and vehicle request torque TO* is set on the ordinate axis. In FIG. 12, the engine rotating speed NE is set on the abscissa axis and the engine torque TE is set on the ordinate axis.

First, an initialization processing means (not specifically shown) of the vehicle controller 51 (FIG. 6) sets various variables to initial values by performing an initialization processing. Next, the vehicle controller 51 performs a vehicle request torque determination processing and reads the accelerator pedal position AP from the accelerator switch 55 and the brake pedal position BP from the brake switch 62. The vehicle speed calculation processing means reads the drive motor rotor position θM, calculates the changing ratio ΔθM of the drive motor rotor position θM, and also calculates the vehicle speed V on the basis of the changing ratio ΔθM and the gear ratio γV.

Subsequently, a vehicle request torque determination processing means (not specifically shown) of the vehicle controller 51 performs vehicle request torque determination processing, and refers to the first vehicle request torque map, of FIG. 10, recorded in the recorder, or memory, of the vehicle controller 51, when the accelerator pedal 54 is stepped on. The vehicle request torque determination processing means (not specifically shown) of the vehicle controller 51 also refers to the second vehicle request torque map of FIG. 11, recorded in the recorder, when the brake pedal 61 is stepped on. The vehicle request torque determination processing means (not specifically shown) of the vehicle controller 51 then determines the vehicle request torque TO* required to run the hybrid type vehicle as set in advance in correspondence to the accelerator pedal position AP, the brake pedal position BP and the vehicle speed V.

Next, the vehicle controller 51 judges whether the vehicle request torque TO* is greater than drive motor maximum torque TMmax as a second electrically operated machine maximum torque showing a maximum value of the drive motor torque TM. When the vehicle request torque TO* is greater than the drive motor maximum torque TMmax, the vehicle controller 51 judges whether the engine 11 is stopped. When the engine 11 is stopped, a sudden acceleration control processing means (not specifically shown) of the vehicle controller 51 performs sudden acceleration control processing, and runs the hybrid type vehicle by driving the drive motor 25 and the electric generator 16.

In contrast to this, when the vehicle request torque TO* is the drive motor maximum torque TMmax or less or when the vehicle request torque TO* is greater than the drive motor maximum torque TMmax and the engine 11 is not stopped, i.e., is operating, a driver request output calculation processing means (not specifically shown) of the vehicle controller 51 performs driver request output calculation processing, and calculates driver request output PD as $PD=TO^* \cdot V$ by multiplying the vehicle request torque TO* and the vehicle speed V. When the vehicle request torque TO* and the drive motor maximum torque TMmax are compared with each other, the drive motor maximum torque TMmax is actually multiplied by a gear ratio γMA from the drive motor rotor position sensor 39 to the drive shaft of the drive wheel 37, and the vehicle request torque TO* and the multiplied value are compared with each other. The first and second vehicle request torque maps can also be made by knowing the gear ratio γMA in advance.

Next, a battery charge-discharge request output calculation processing means (not specifically shown) of the vehicle controller 51 performs battery charge-discharge request output calculation processing, reads the battery remaining amount SOC from the above battery remaining amount detector 44, and calculates a battery charge-discharge request output PB on the basis of the battery remaining amount SOC.

Subsequently, a vehicle request output calculation processing means (not specifically shown) of the vehicle controller 51 performs vehicle request output calculation processing, and calculates a vehicle request output PO as $PO=PD+PB$ by adding the driver request output PD and the battery charge-discharge request output PB.

Next, an engine target operating state setting processing means (not specifically shown) of the vehicle controller 51 performs engine target operating state setting processing, and refers to the engine target operating state map of FIG. 12 recorded in the recorder of the vehicle controller 51. The engine target operating state setting processing means of the vehicle controller 51 then determines points A1 to A3, Am as operating points of the engine 11 as an engine target operating state. At the points A1 to A3, Am, the lines PO1, PO2, . . . show the vehicle request output PO, and an optimum fuel cost curve L, highest in efficiency of the engine 11 in each of accelerator pedal positions AP1 to AP6, cross each other. The engine target operating state setting processing means of the vehicle controller 51 also determines engine torques TE1 to TE3, TEm at the operating points as an engine target torque TE* showing a target value of the engine torque TE. The engine target operating state setting processing means of the vehicle controller 51 also determines engine rotating speeds NE1 to NE3, NEm at the operating points as the engine target rotating speed NE*, and sends the engine target rotating speed NE* to the engine controller 46.

The engine controller 46 then refers to the engine driving area map of FIG. 13, recorded in the recorder of the engine controller 46, and judges whether the engine 11 is placed in a driving area AR1. In FIG. 13, reference numerals AR1, AR2 and AR3 respectively designate a driving area for operating the engine 11, a stopping area for stopping the operation of the engine 11, and a hysteresis area. Further, reference numerals LE1 and LE2 respectively designate a line for operating the stopped engine 11, and a line for stopping the operation of the operated engine 11. The line LE1 is moved rightward in FIG. 13 and the driving area AR1 is narrowed as the battery remaining amount SOC is increased. The line LE1 is moved leftward in FIG. 13 and the driving area AR1 is widened as the battery remaining amount SOC is reduced.

When the engine 11 is not operated although the engine 11 is placed in the driving area AR1, an engine starting control processing means (not specifically shown) of the engine controller 46 performs engine starting control processing and starts the engine 11. Further, when the engine 11 is operated although the engine 11 is not placed in the driving area AR1, an engine stopping control processing means (not specifically shown) of the engine controller 46 performs engine stopping control processing and stops operation of the engine 11. When the engine 11 is not placed in the driving area AR1 and engine 11 is not operated, a drive motor target torque calculation processing means (not specifically shown) of the vehicle controller 51 performs drive motor target torque calculation processing and calculates, or determines, the vehicle request torque TO* as drive motor target torque TM*, and sends the drive motor target torque TM* to the drive motor controller 49. A drive motor control processing means (not specifically shown) of the drive motor controller 49 performs drive motor control processing and performs torque control of the drive motor 25.

When the engine 11 is placed in the driving area AR1 and the engine 11 is operated, an engine control processing means (not specifically shown) of the engine controller 46 performs engine control processing and controls the operation of the engine 11 using a predetermined method.

Next, an electric generator target rotating speed calculation processing means (not specifically shown) of the electric generator controller 47 performs electric generator target rotating speed calculation processing and reads the drive motor rotor position θM from the vehicle controller 51. The electric generator target rotating speed calculation processing means of the electric generator controller 47 then calculates the ring gear rotating speed NR on the basis of the drive motor rotor position θM and a gear ratio γR from the output shaft 26 (FIG. 2) to the ring gear R. The electric generator target rotating speed calculation processing means of the electric generator controller 47 also reads the engine target rotating speed NE*, determined in the engine target operating state setting processing, and calculates the electric generator target rotating speed NG* by using the rotating speed relation formula (1) on the basis of the ring gear rotating speed NR and the engine target rotating speed NE*.

When the hybrid type vehicle of the above structure runs by the drive motor 25 and the engine 11, and the electric generator rotating speed NG is low, electric power consumption is increased, the electricity generating efficiency of the electric generator 16 is reduced and fuel cost of the hybrid type vehicle, correspondingly, gets worse. Therefore, when the absolute value of the electric generator target rotating speed NG* is smaller than a predetermined rotating speed, the electric generator brake B is engaged and the operation of the electric generator 16 is mechanically stopped such that the fuel cost is improved.

Therefore, the electric generator controller 47 judges whether the absolute value of the electric generator target rotating speed NG* is a predetermined first rotating speed Nth1 (e.g., 500 [rpm]) or more. When the absolute value of the electric generator target rotating speed NG* is the first rotating speed Nth1 or more, the electric generator controller 47 judges whether the electric generator brake B is released. When the electric generator brake B is released, an electric generator rotating speed control processing means (not specifically shown) of the electric generator controller 47 performs electric generator rotating speed control processing and performs torque control of the electric generator 16. In contrast to this, when the electric generator brake B is not released, an electric generator brake release control processing means (not specifically shown) of the electric generator controller 47 performs electric generator brake release control processing and releases the electric generator brake B.

When the electric generator target torque TG* is determined in the electric generator rotating speed control processing and the torque control of the electric generator 16 is performed on the basis of the electric generator target torque TG* and the predetermined electric generator torque TG is generated, reaction forces are mutually applied to the engine torque TE, the ring gear torque TR and the electric generator torque TG as mentioned above. Accordingly, the electric generator torque TG is converted into the ring gear torque TR and is outputted from the ring gear R.

When the electric generator rotating speed NG is changed and the ring gear torque TR is changed as the ring gear torque TR is outputted from the ring gear R, the changed ring gear torque TR is transmitted to the drive wheel 37 and a running feeling of the hybrid type vehicle is reduced. Therefore, the ring gear torque TR is calculated by expecting the torque of an inertia (inertias of the rotor 21 and a rotor shaft) amount of the electric generator 16 caused by changing the electric generator rotating speed NG.

Therefore, a ring gear torque calculation processing means (not specifically shown) of the vehicle controller 51 performs ring gear torque calculation processing, reads the electric generator target torque TG* and calculates the ring gear torque TR on the basis of the electric generator target torque TG* and a ratio of the tooth number of the ring gear R with respect to the tooth number of the sun gear S.

Namely, when the inertia of the electric generator 16 is set to InG and the angular acceleration (rotation changing ratio) of the electric generator 16 is set to αG, the torque applied to the sun gear S, i.e., sun gear torque TS is obtained by adding a torque equivalent component (inertia torque) TGI, where $$TGI = InG \cdot \alpha G$$

of the inertia InG amount, to the electric generator target torque TG*. Thus, the following formula is formed.

$$TS = TG^* + TGI$$

$$= TG^* + InG \cdot \alpha G \tag{3}$$

The torque equivalent component TGI normally has a negative value with respect to the accelerating direction during the acceleration of the hybrid type vehicle, and also has a positive value with respect to the accelerating direction during the deceleration of the hybrid type vehicle. The angular acceleration αG is calculated by differentiating the electric generator rotating speed NG.

When the tooth number of the ring gear R is set to ρ times the tooth number of the sun gear S, the ring gear torque TR is ρ times the sun gear torque TS. Accordingly, the following formula is formed.

$$TR = \rho \cdot TS \tag{4}$$
$$= \rho \cdot (TG^* + TGI)$$
$$= \rho \cdot (TG^* + InG \cdot \alpha G)$$

Thus, the ring gear torque TR can be calculated from the electric generator target torque TG* and the torque equivalent component TGI.

Therefore, a drive shaft torque presumption processing means (not specifically shown) of the drive motor controller 49 performs drive shaft torque presumption processing and calculates a torque in the output shaft 26, i.e., drive shaft torque TR/OUT on the basis of the electric generator target torque TG* and the torque equivalent component TGI. Namely, the drive shaft torque presumption processing means calculates the drive shaft torque TR/OUT on the basis of the ring gear torque TR and a ratio of the tooth number of the second counter drive gear 27 with respect to the tooth number of the ring gear R.

Because the electric generator target torque TG* is set to zero (0) when the electric generator brake B is engaged, the ring gear torque TR has a proportional relationship with respect to the engine torque TE. Therefore, when the electric generator brake B is engaged, the drive shaft torque presumption processing means reads the engine torque TE, through the vehicle controller 51, and calculates the ring gear torque TR by using the torque relation formula (2) on the basis of the engine torque TE. The drive shaft torque presumption processing means further calculates the drive shaft torque TR/OUT on the basis of the ring gear torque TR and the ratio of the tooth number of the second counter drive gear 27 with respect to the tooth number of the ring gear R.

Subsequently, the drive motor target torque calculation processing means performs the drive motor target torque calculation processing, and subtracts the drive shaft torque TR/OUT from the vehicle request torque TO*. Thus, the drive motor target torque calculation processing means calculates an excessive or deficient amount in the drive shaft torque TR/OUT as the drive motor target torque TM*.

The drive motor control processing means then performs the drive motor control processing and performs torque control of the drive motor 25 on the basis of the determined drive motor target torque TM*, and controls the drive motor torque TM.

When the absolute value of the electric generator target rotating speed NG* is smaller than the first rotating speed Nth1, the electric generator controller 47 judges whether the electric generator brake B is engaged. When the electric generator brake B is not engaged, an electric generator brake engagement control processing means (not specifically shown) of the electric generator controller 47 performs electric generator brake engagement control processing and engages the electric generator brake B.

As the electric generator 16, the drive motor 25, etc. are operated, temperatures tmM, tmMI, tmG, tmGI, tmO, etc. are raised and the characteristics of the electric generator 16, the drive motor 25, etc. are reduced.

Therefore, a command value correction processing means (not specifically shown) of the vehicle controller 51 performs command value correction processing and reads predetermined temperatures of the temperatures tmM, tmMI, tmG, tmGI, tmO, etc., the electric generator rotating speed NG and the drive motor rotating speed NM, and corrects and limits the electric generator target torque TG* and the drive motor target torque TM* as necessary.

Figure 7:
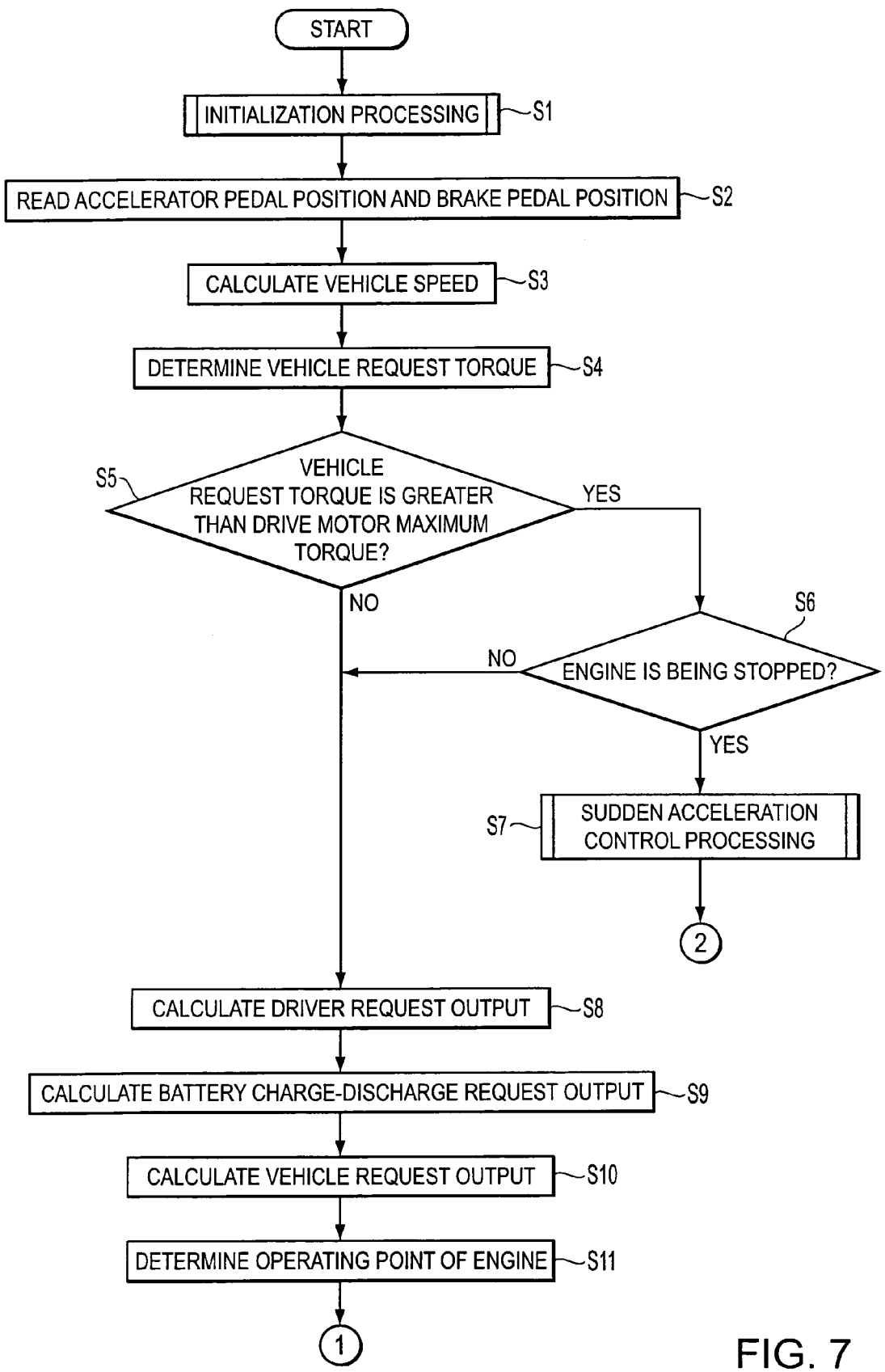
FIG. 7 is a first main flow chart showing the operation of the hybrid type vehicle driving controller in the first form of the invention.
Figure 8:
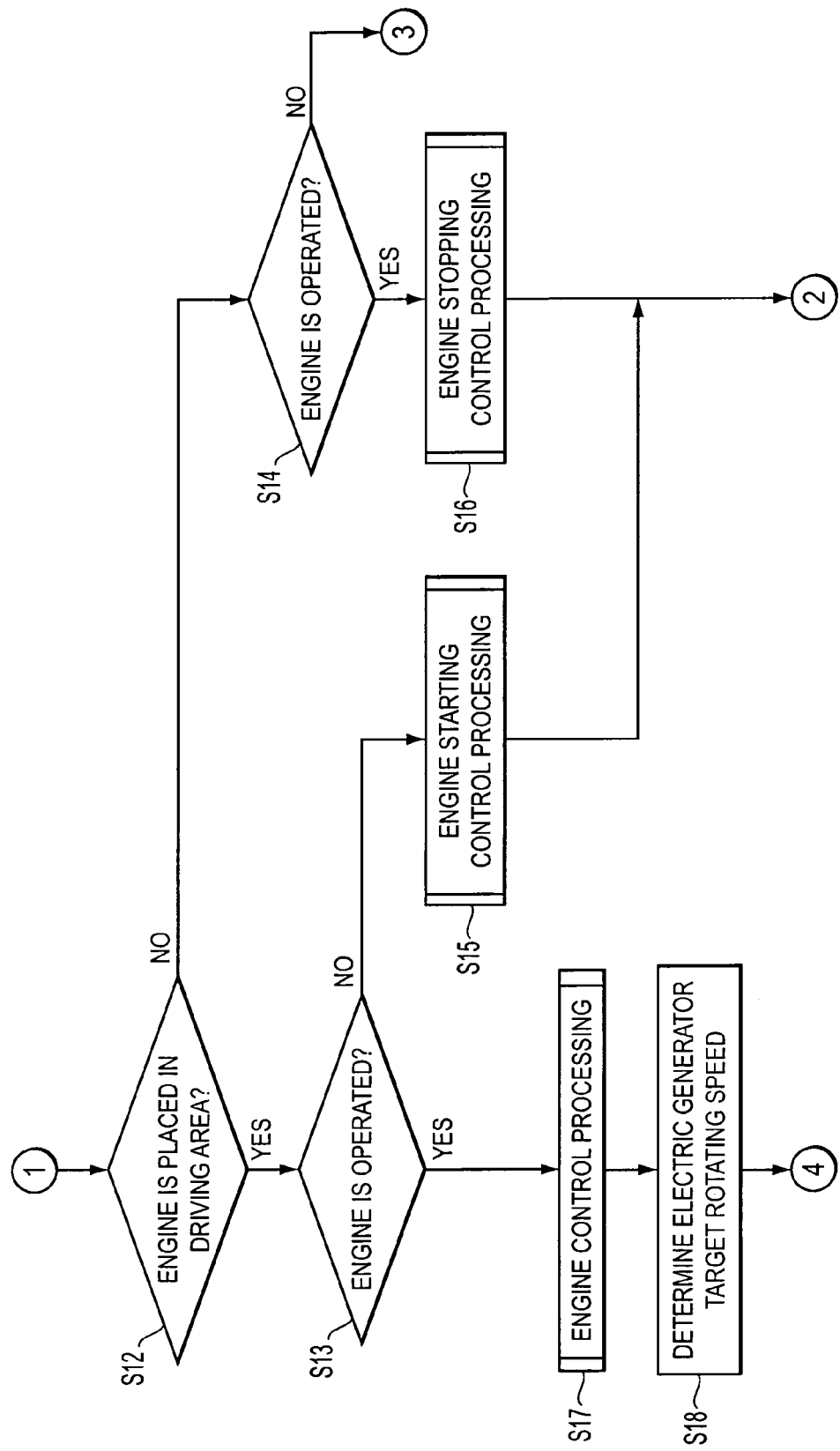
FIG. 8 is a second main flow chart showing the operation of the hybrid type vehicle driving controller in the first form of the invention.
Figure 9:
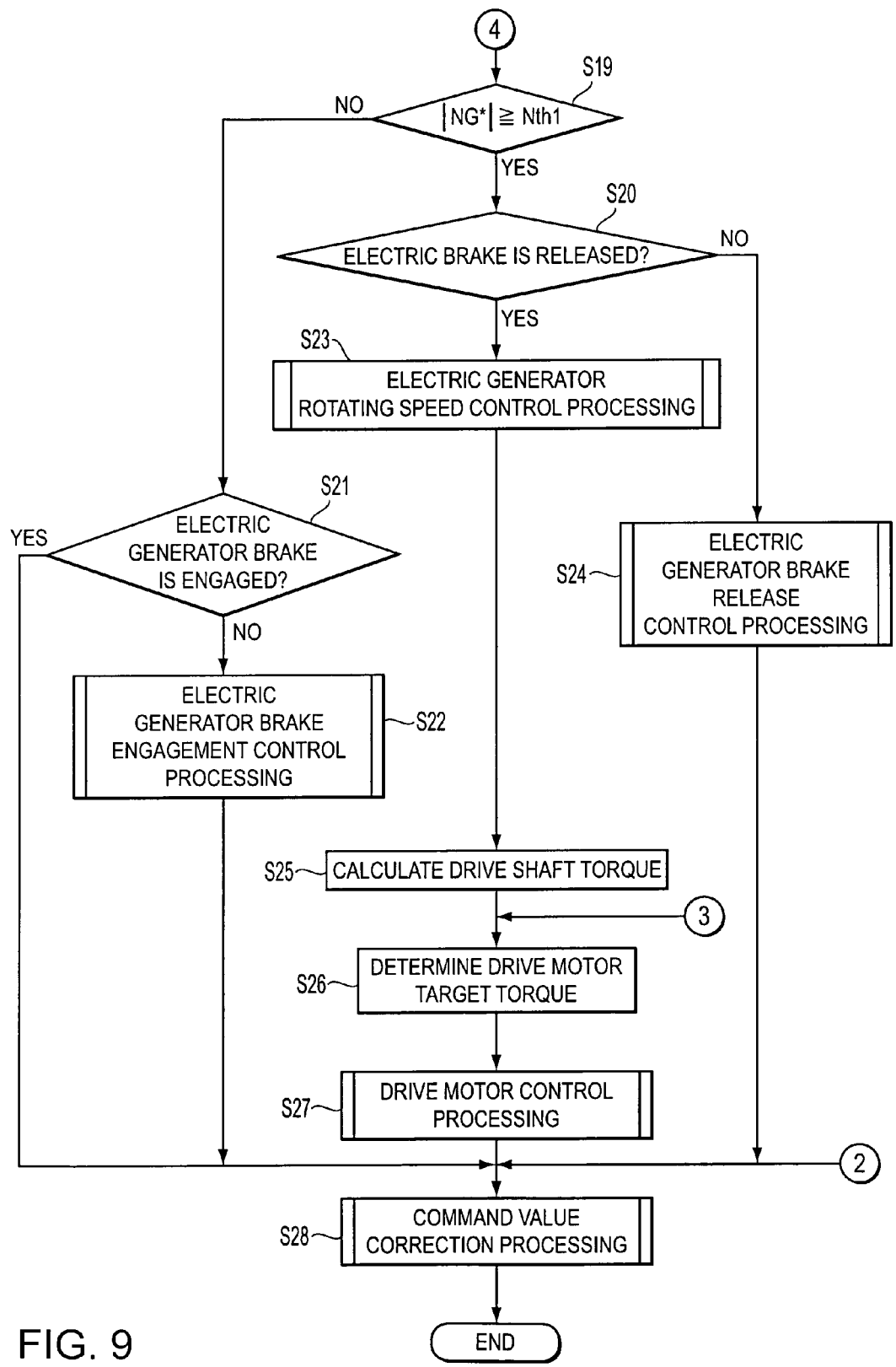
FIG. 9 is a third main flow chart showing the operation of the hybrid type vehicle driving controller in the first form of the invention.

Based on the foregoing, the flow charts of FIGS. 7 to 9 will be summarized. At step S1, initialization processing is performed and in step S2, the accelerator pedal position AP and the brake pedal position BP are read. Then, in step S3, the vehicle speed V is calculated, and in step S4, the vehicle request torque TO* is determined. In step S5, it is judged whether the vehicle request torque TO* is greater than the drive motor maximum torque TMmax. When the vehicle request torque TO* is greater than the drive motor maximum torque TMmax, the process proceeds to step S6. Contrarily, when the vehicle request torque TO* is the drive motor maximum torque TMmax or less, the process proceeds to step S8.

In step S6, a judgement is made whether the engine 11 is stopped. When the engine 11 is stopped, the process proceeds to step S7. When the engine 11 is not stopped, the process proceeds to the step S8.

When the engine 11 is stopped in step S7, sudden acceleration control processing is performed. When the engine 11 is not stopped or when the vehicle request torque is not greater than the drive motor maximum torque (S5; No), in step S8 the driver request output PD is calculated.

Then, in step S9 the battery charge-discharge request output PB is calculated, in step S10 the vehicle request output PO is calculated, and in step S11 the operating point of the engine 11 is determined.

In step S12, it is judged whether the engine 11 is placed in the driving area AR1. When the engine 11 is placed in the driving area AR1, the process proceeds to step S13. When the engine 11 is not placed in the driving area AR1, the process proceeds to step S14.

In step S13, it is judged whether the engine 11 is operated. When the engine 11 is operated, the process proceeds to step S17, and when the engine 11 is not operated, i.e., the engine 11 is stopped, the process proceeds to step S15.

When, in step S12 it is determined the engine 11 is not placed in driving area AR1, in step S14 it is judged whether the engine 11 is operated. When the engine 11 is operated, the process proceeds to step S116, and when engine 11 is not operated, the process proceeds to step S26.

In step S15, following step S12 yes and step S13 no, engine starting control processing is performed, whereas in step S16, following step S12 no and step S14 yes, engine stopping control processing is performed.

In step S17, following steps S12 and S13 yes, engine control processing is performed. Then, in step S18, the electric generator target rotating speed NG* is determined. Following step S18, in step S19, it is judged whether the absolute value of the electric generator target rotating speed NG* is greater than or equal to the first rotating speed Nth1. When the absolute value of the electric generator target rotating speed NG* is greater than or equal to the first rotating speed Nth1, the process proceeds to step S20, and when the absolute value of the electric generator target rotating speed NG* is less than the first rotating speed Nth1, the process proceeds to step S21.

In step S20, it is judged whether the electric generator brake B is released. When the electric generator brake B is released, the process proceeds to step S23, when the electric generator brake B is not released, the process proceeds to step S24.

At step S21, following step S19 no, it is judged whether the electric generator brake B is engaged. When the electric generator brake B is engaged, the process proceeds to step S28, when the electric generator brake B is not engaged, the process proceeds to step S22. In step S22, electric generator brake engagement control processing is performed and then processing proceeds to step S28.

When processing proceeds to step S23, after steps S19 and S20 yes, electric generator rotating speed control processing is performed and processing passes to step S25 where the drive shaft torque TR/OUT is calculated. Conversely, when step S20 is no, in step S24 electric generator brake release control processing is performed. Following step S25, in step S26 the drive motor target torque TM* is determined, in step S27 the drive motor control processing is performed, and in step S28 a command value correction processing is performed and the processing is terminated.

Figure 14:
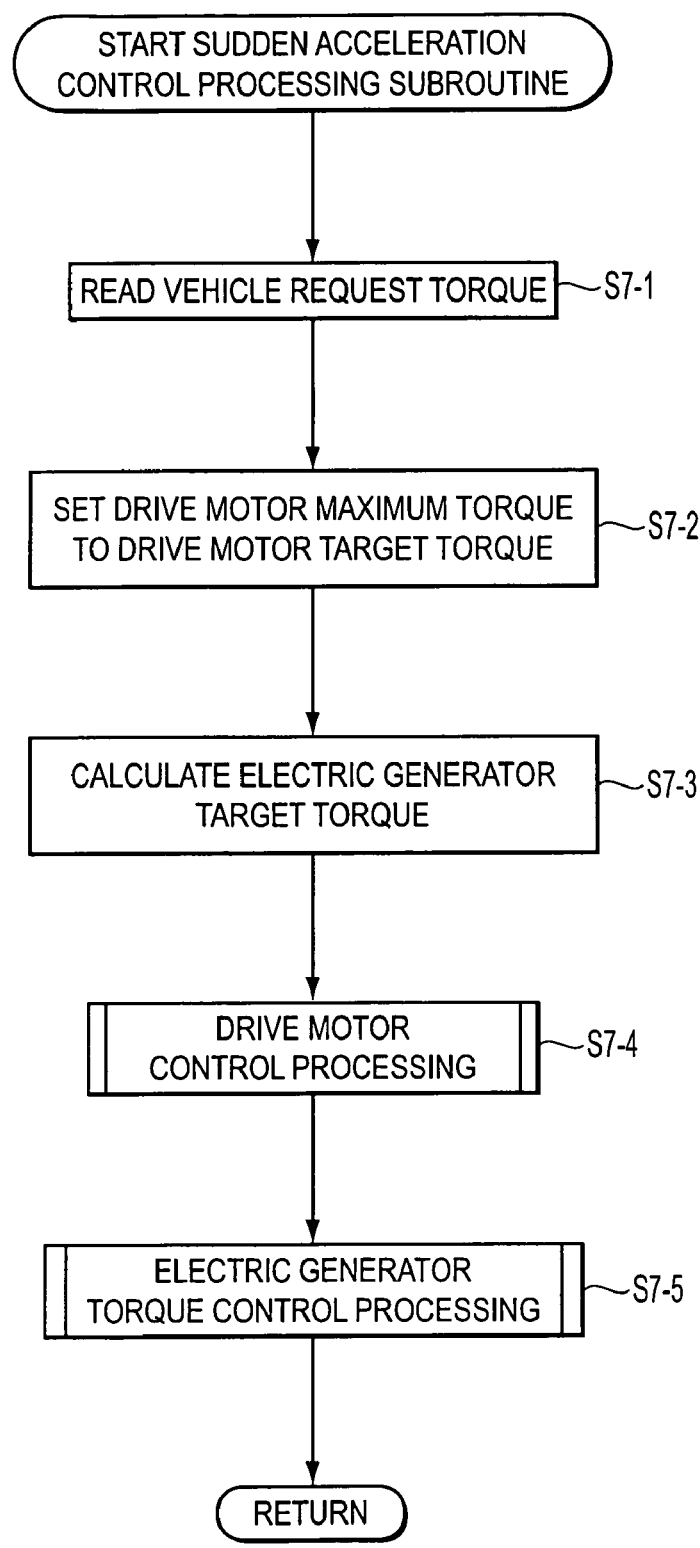
FIG. 14 shows a subroutine of sudden acceleration control processing in the first form of the invention.

The subroutine of the sudden acceleration control processing formed in step S7, of FIG. 7, will next be explained using FIG. 14.

First, the sudden acceleration control processing means reads the vehicle request torque TO* (step S7-1) and sets the drive motor maximum torque TMmax to the drive motor target torque TM* (step S7-2). Subsequently, an electric generator target torque calculation processing means (not specifically shown) of the vehicle controller 51 (FIG. 6) performs electric generator target torque calculation processing and calculates the difference torque ΔT between the vehicle request torque TO* and the drive motor target torque TM* (step S7-3). The electric generator target torque calculation processing means of the vehicle controller 51 also calculates and determines a deficient amount in the drive motor maximum torque TMmax being the drive motor target torque TM* as the electric generator target torque TG*, and sends the electric generator target torque TG* to the electric generator controller 47.

The drive motor control processing means then performs the drive motor control processing and performs the torque control of the drive motor 25 by the drive motor target torque TM* (step S7-4). Further, an electric generator torque control processing means (not specifically shown) of the electric generator controller 47 performs electric generator torque control processing and also performs the torque control of the electric generator 16 on the basis of the above electric generator target torque TG* (step S7-5). The subroutine is completed and processing returned to where the subroutine was initiated.

Figure 15:
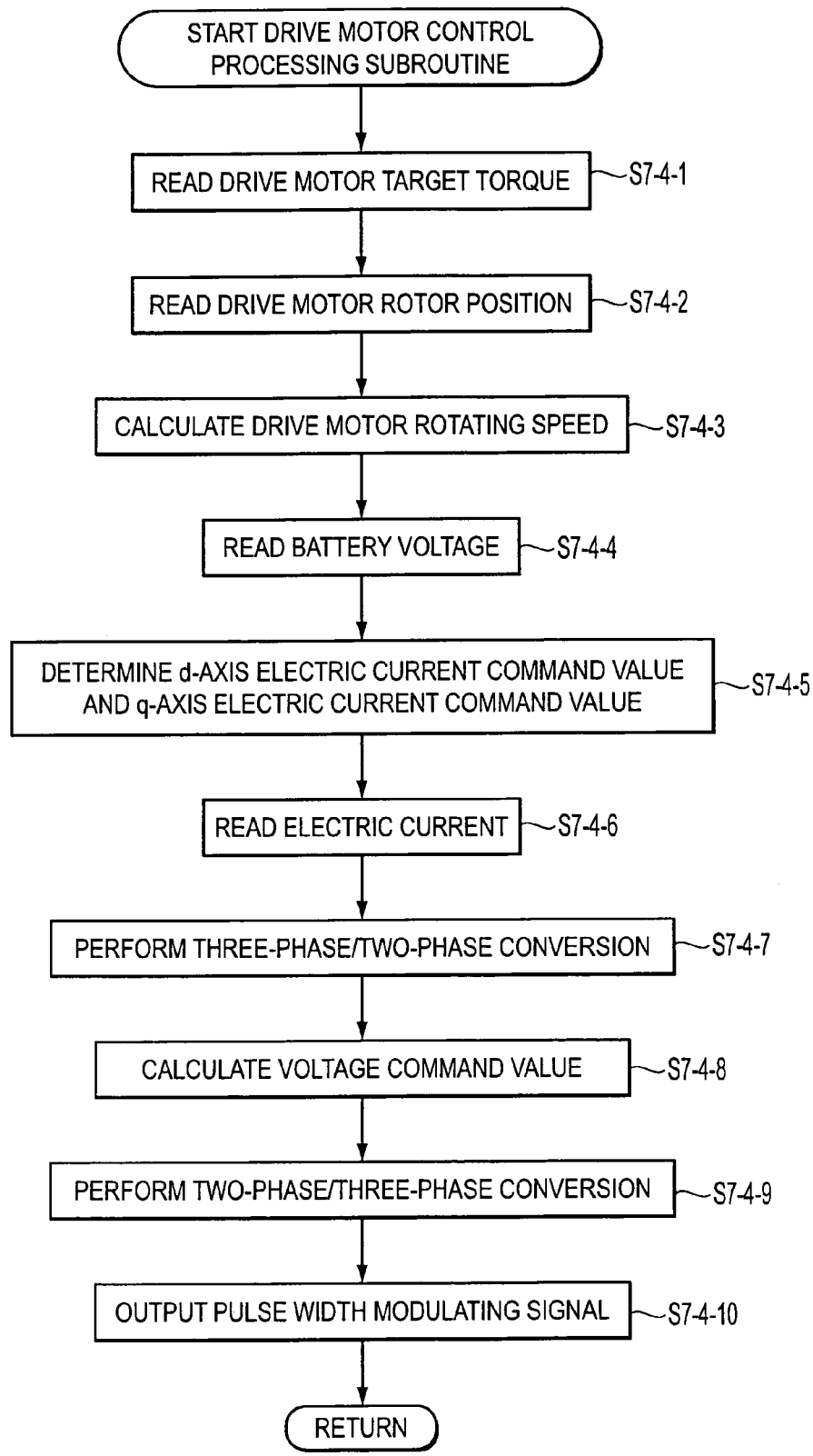
FIG. 15 shows a subroutine of drive motor control processing in the first form of the invention.

Next, the subroutine of the drive motor control processing performed in each of step S27 of FIG. 9 and step S7-4 of FIG. 14 will be explained using FIG. 15.

First, the drive motor control processing means reads the drive motor target torque TM* (step S7-4-1). Subsequently, the drive motor rotating speed calculation processing means reads the drive motor rotor position θM (step S7-4-2) and calculates the drive motor rotating speed NM by calculating the changing ratio ΔθM of the drive motor rotor position θM (step S7-4-3). The drive motor control processing means then reads the battery voltage VB (step S7-4-4). The actual measuring value is derived from the drive motor rotating speed NM and the battery voltage VB.

The drive motor control processing means next calculates, or determines, a d-axis electric current command value IMd* and a q-axis electric current command value IMq* by referring to an electric current command value map for the drive motor control recorded to the recorder of the above drive motor controller 49 (FIG. 6) on the basis of the drive motor target torque TM*, the drive motor rotating speed NM and the battery voltage VB (step S7-4-5). An alternating electric current command value for the drive motor 25 is derived from the d-axis electric current command value IMd* and the q-axis electric current command value IMq*.

Further, the drive motor control processing means reads electric currents IMU, IMV from the electric current sensors 68, 69 and calculates an electric current IMW $$IMW=IMU-IMV$$

on the basis of the electric currents IMU, IMV. Similar to the electric currents IMU, IMV, the electric current IMW can be also detected by an electric current sensor (step S7-4-6).

Subsequently, an alternating electric current calculation processing means of the drive motor control processing means performs alternating electric current calculation processing and also performs three-phase/two-phase conversion to convert the electric currents IMU, IMV, IMW into a d-axis electric current IMd and a q-axis electric current IMq, as alternating electric currents, by calculating the d-axis electric current IMd and the q-axis electric current IMq (step S7-4-7). An alternating current voltage command value calculation processing means of the drive motor control processing means performs alternating current voltage command value calculation processing and calculates voltage command values VMd*, VMq* on the basis of the d-axis electric current IMd and q-axis electric current IMq, and the above d-axis electric current command value IMd* and q-axis electric current command value IMq* (step S7-4-8). Further, the drive motor control processing means performs two-phase/three-phase conversion and converts the voltage command values VMd*, VMq* into voltage command values VMU*, VMV*, VMW* (step S7-4-9). The drive motor control processing means further calculates pulse width modulating signals Su, Sv, Sw on the basis of the voltage command values VMU*, VMV*, VMW*, and outputs the pulse width modulating signals Su, Sv, Sw to a drive processing means (not specifically shown) of the drive motor controller 49. The drive processing means performs drive processing and sends a driving signal SG2 to the inverter 29 on the basis of the pulse width modulating signals Su, Sv, Sw. An alternating current voltage command value for the drive motor 25 is derived from the voltage command values VMd*, VMq* (step S7-4-10). That completes the subroutine and processing returns to where the subroutine was initiated.

Figure 16:
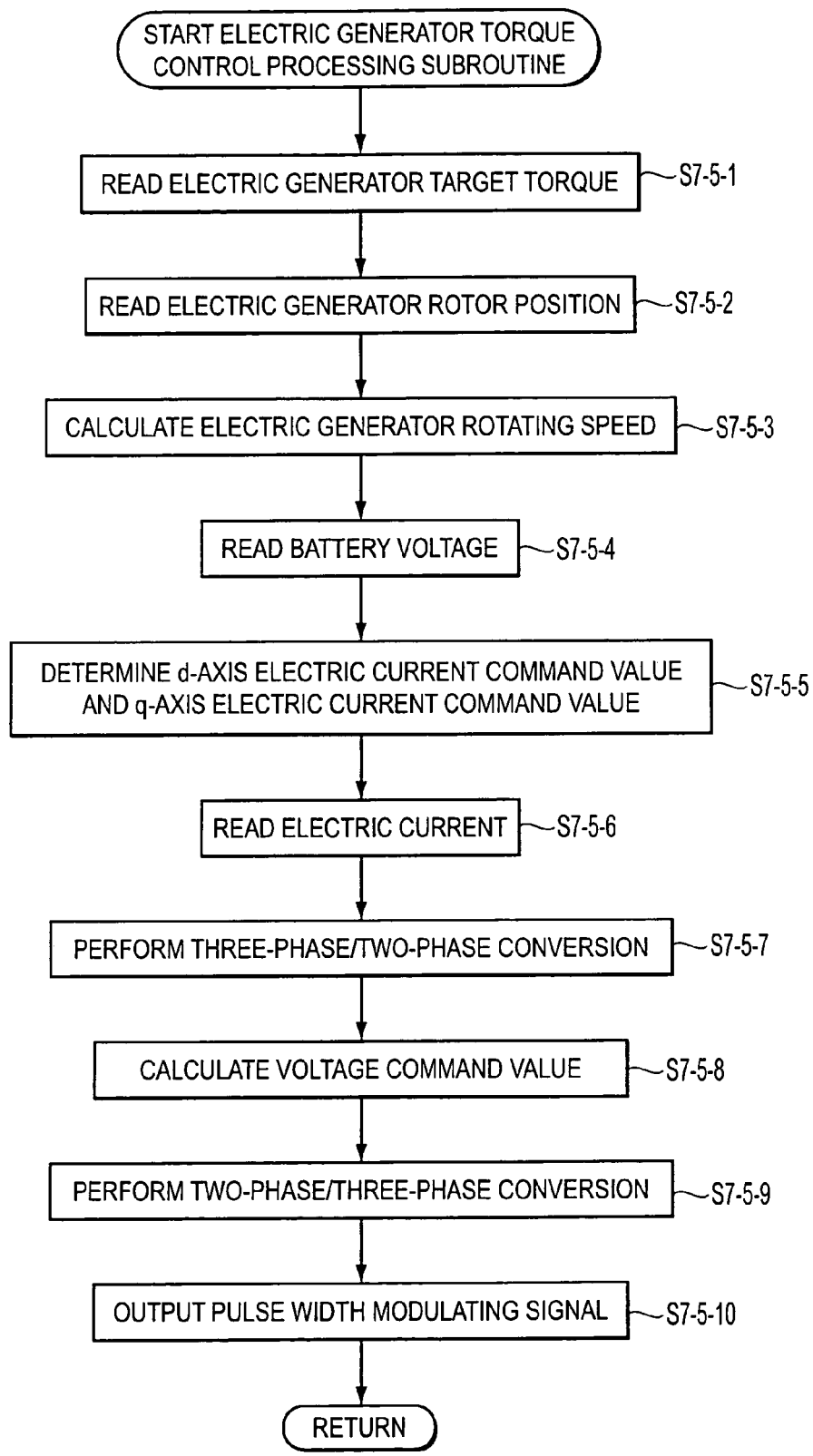
FIG. 16 shows a subroutine of electric generator torque control processing in the first form of the invention.

A subroutine for the electric generator torque control processing in the step S7-5 of FIG. 14 will be explained using FIG. 16.

First, the electric generator torque control processing means reads the electric generator target torque TG* (step S7-5-1), reads the electric generator rotor position θG (step S7-5-2) and calculates the electric generator rotating speed NG on the basis of the electric generator rotor position θG (step S7-5-3). Subsequently, the electric generator torque control processing means reads the battery voltage VB. The actually measured value is derived from the electric generator rotating speed NG and the battery voltage VB (step S7-5-4). Next, the electric generator torque control processing means determines a d-axis electric current command value IGd* and a q-axis electric current command value IGq* by referring to an electric current command value map for the electric generator control recorded in the recorder of the electric generator controller 47 (FIG. 6) on the basis of the electric generator target torque TG*, the electric generator rotating speed NG and the battery voltage VB. An alternating electric current command value for the electric generator 16 is derived from the d-axis electric current command value IGd* and the q-axis electric current command value IGq* (step S7-5-5).

Further, the electric generator torque control processing means reads electric currents IGU, IGV from electric current sensors 66, 67, and calculates an electric current IGW as $$IGW=IGU-IGV$$

on the basis of the electric currents IGU, IGV. Similar to the electric currents IGU, IGV, the electric current IGW can be also detected by an electric current sensor (step S7-5-6).

Subsequently, the alternating electric current calculation processing means of the electric generator torque control processing means performs the alternating electric current calculation processing and also performs the three-phase/two-phase conversion, and calculates a d-axis electric current IGd and a q-axis electric current IGq by converting the electric currents IGU, IGV, IGW into the d-axis electric current IGd and the q-axis electric current IGq (step S7-5-7). The alternating current voltage command value calculation processing means of the electric generator torque control processing means performs the alternating current voltage command value calculation processing and calculates voltage command values VGd*, VGq* on the basis of the d-axis electric current IGd, the q-axis electric current IGq, the d-axis electric current command value IGd* and the q-axis electric current command value IGq* (step S7-5-8). Further, the electric generator torque control processing means performs the two-phase/three-phase conversion and converts the voltage command values VGd*, VGq* into voltage command values VGU*, VGV*, VGW* (step S7-5-9).

Further, the electric generator torque control processing means calculates pulse width modulating signals Su, Sv, Sw on the basis of the voltage command values VGU*, VGV*, VGW*, and outputs the pulse width modulating signals Su, Sv, Sw to a drive processing means (not specifically shown) of the electric generator controller 47. The drive processing means performs drive processing and sends a driving signal SG1 to the inverter 28 on the basis of the pulse width modulating signals Su, Sv, Sw. Lastly, an alternating current voltage command value for the electric generator 16 is derived from the voltage command values VGd*, VGq* (step S7-5-10). Then, the subroutine is finished and processing returns to where the subroutine was initiated.

Figure 17:
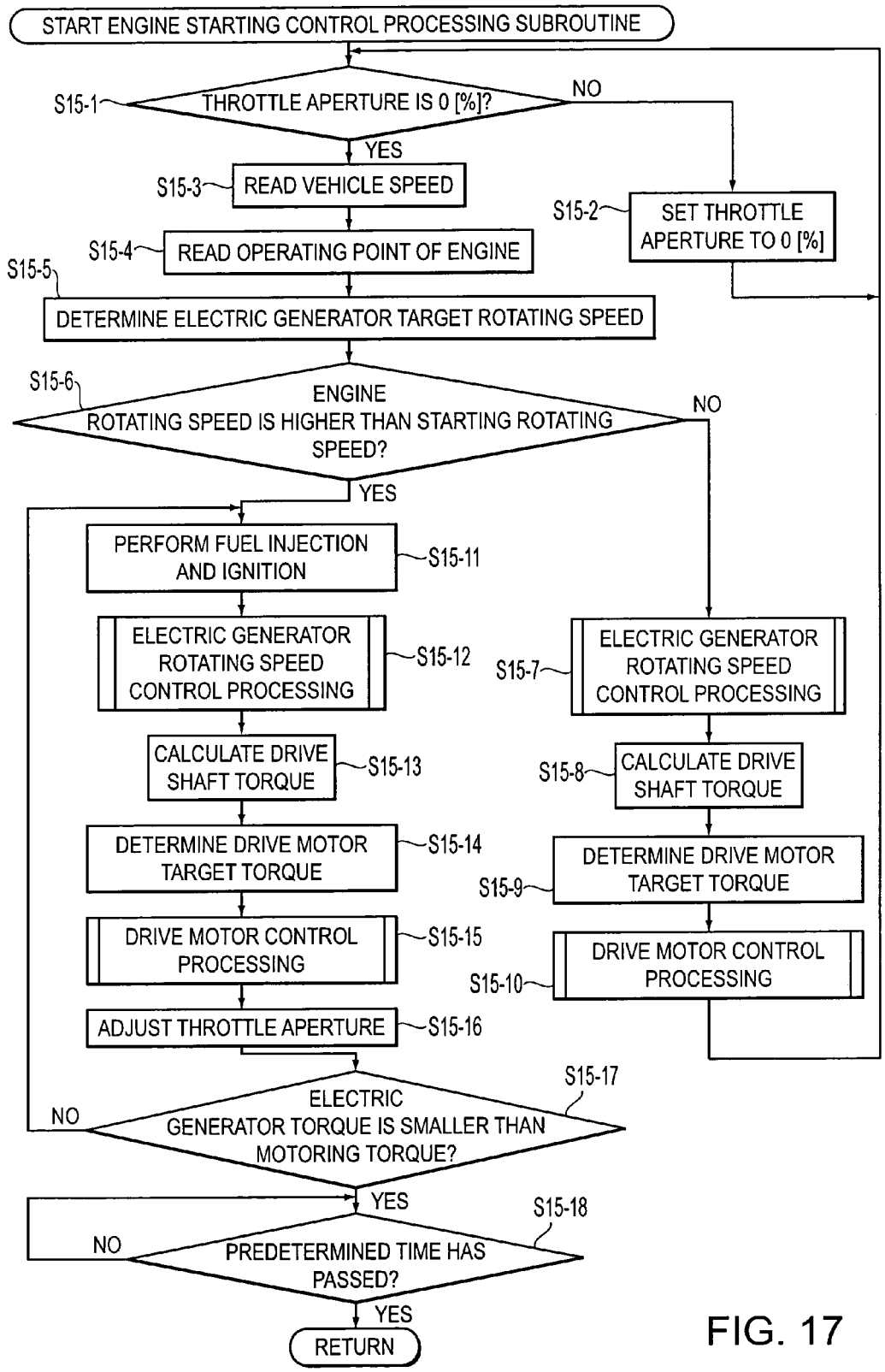
FIG. 17 shows a subroutine of engine starting control processing in the first form of the invention.

The subroutine for the engine starting control processing found in the step S115 of FIG. 8 will next be explained using FIG. 17.

First, in step S15-1, the engine starting control processing means reads the throttle aperture θ and also reads the vehicle speed V calculated by the vehicle speed calculation processing means when the throttle aperture θ is 0 [%] (step S15-3). Further, the engine starting control processing means reads the operating point of the engine 11 (FIG. 6) determined in the engine target operating state setting processing (step S15-4).

Subsequently, as mentioned above, the electric generator target rotating speed calculation processing means performs electric generator target rotating speed calculation processing and reads the drive motor rotor position θM. The electric generator target rotating speed calculation processing means then calculates the ring gear rotating speed NR on the basis of the drive motor rotor position θM and the gear ratio γR, and calculates the engine target rotating speed NE* at the operating point. Further, the electric generator target rotating speed calculation processing means calculates and determines the electric generator target rotating speed NG* by the rotating speed relation formula (1) on the basis of the ring gear rotating speed NR and the engine target rotating speed NE* (step S15-5).

The engine controller 46 then compares the engine rotating speed NE and a starting rotating speed NEth1 set in advance, and judges whether the engine rotating speed NE is higher than the starting rotating speed NEth1 (step S15-6). When the engine rotating speed NE is higher than the starting rotating speed NEth1, the engine starting control processing means performs fuel injection and ignition in the engine 11 (step S15-11).

Subsequently, the electric generator rotating speed control processing means performs the electric generator rotating speed control processing on the basis of the electric generator target rotating speed NG* and raises the electric generator rotating speed NG and thus raises the engine rotating speed NE (step S15-12).

The drive motor controller 49 calculates the drive shaft torque TR/OUT (step S15-13), as executed in steps S25 to S27, and determines the drive motor target torque TM* (step S15-14) and performs the drive motor control processing (step S15-15).

Further, the engine starting control processing means adjusts the throttle aperture θ such that the engine rotating speed NE becomes the engine target rotating speed NE* (step S15-16). Next, the engine starting control processing means judges whether the electric generator torque TG is smaller than the motoring torque TEth generated by starting the engine 11 so as to judge whether the engine 11 is normally operated (step S15-17). When the answer in step S15-17 is yes, the engine starting control processing means waits for the passage of a predetermined time in a state in which the electric generator torque TG is smaller than the motoring torque Teth (step S15-18).

In step S15-6, when the engine rotating speed NE is the starting rotating speed NEth1 or less, the electric generator rotating speed control processing means performs the electric generator rotating speed control processing on the basis of the electric generator target rotating speed NG* (step S15-7). Subsequently, as executed in steps S25 to S27, the drive motor controller 49 calculates the drive shaft torque TR/OUT (step S15-8), determines the drive motor target torque TM* (step S15-9), and performs the drive motor control processing (step S15-10).

Further, in step S15-1, when it is judged the throttle aperture θ is not 0 [%], the process proceeds to step S15-2 to set the throttle aperture θ to 0 [%] and processing returns to step S15-1. After step S15-18, processing of the subroutine ends and is returned to where the subroutine was called.

Figure 18:
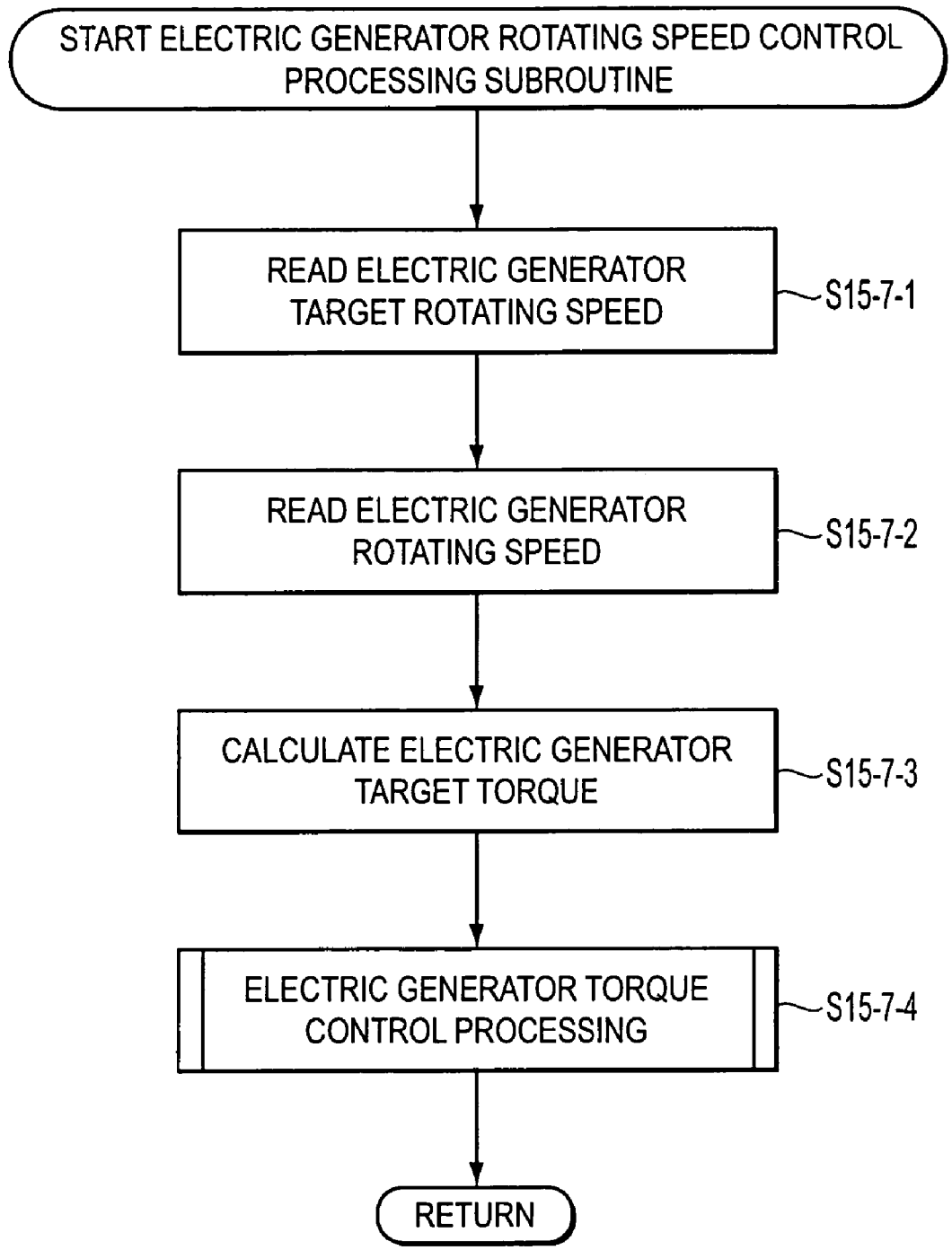
FIG. 18 shows a subroutine of electric generator rotating speed control processing in the first form of the invention.

Next, the subroutine of the electric generator rotating speed control processing in each of step S23 of FIG. 9 and S15-7, S15-12 of FIG. 17 will be explained using FIG. 18.

First, the electric generator rotating speed control processing means reads the electric generator target rotating speed NG* (step S15-7-1) and also reads the electric generator rotating speed NG (step S15-7-2). The electric generator rotating speed control processing means then calculates the electric generator target torque TG* by performing PI control on the basis of the differential rotating speed ΔNG between the electric generator target rotating speed NG* and the electric generator rotating speed NG. In this case, as the differential rotating speed ΔNG is increased, the electric generator target torque TG* is increased and its positive and negative signs are also considered (step S15-7-3).

Subsequently, the electric generator torque control processing means performs the electric generator torque control processing of FIG. 16 and the torque control of the electric generator 16 (FIG. 6) is performed (step S15-7-4). Processing then returns to where the subroutine was called.

Figure 19:
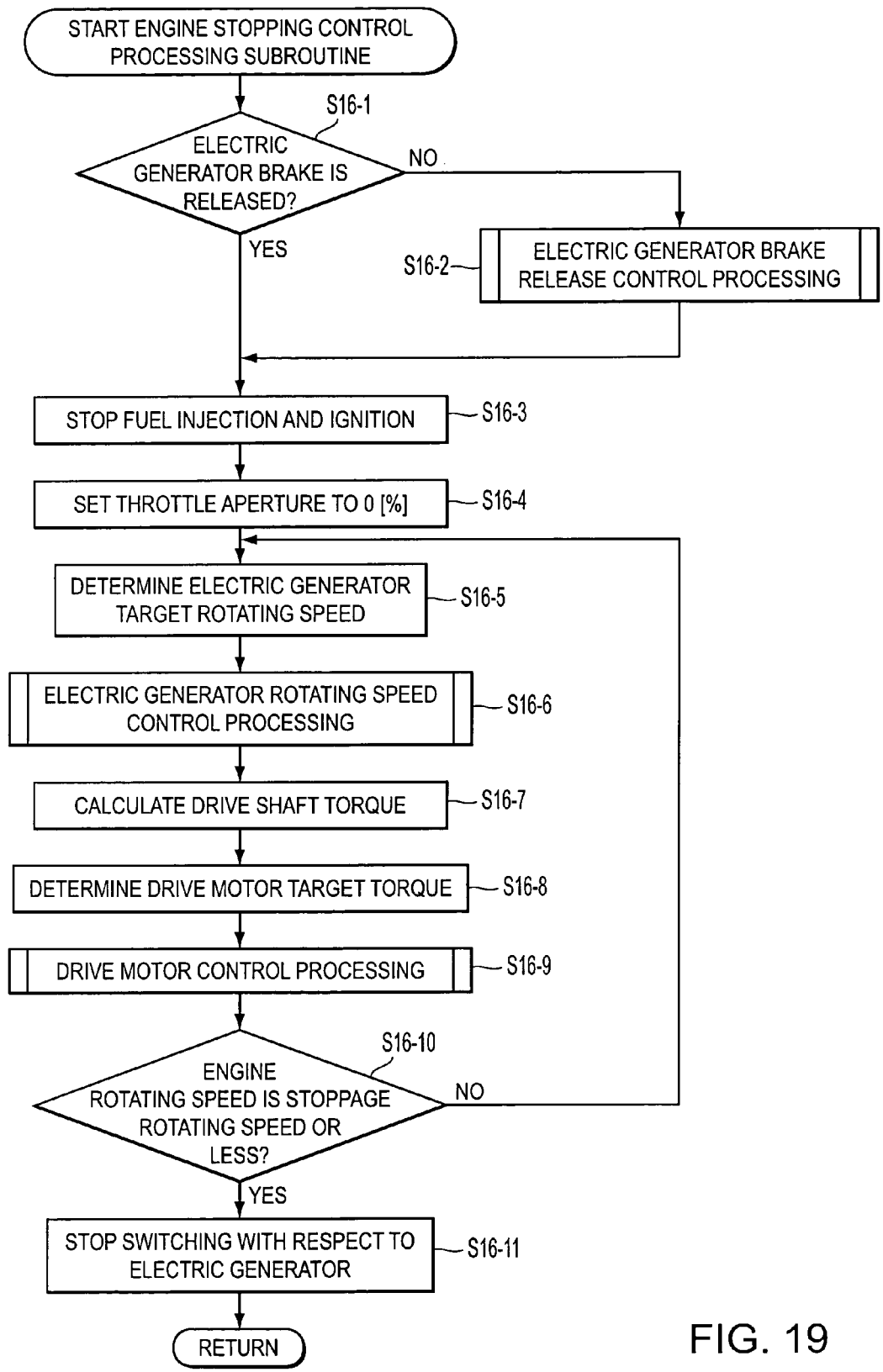
FIG. 19 shows a subroutine of engine stoppage control processing in the first form of the invention.

Next, a subroutine for the engine stopping control processing of step S16 of FIG. 8 will be explained using FIG. 19.

First, the electric generator controller 47 (FIG. 6) judges whether the electric generator brake B is released (step S16-1). When the electric generator brake B is not released but is engaged, the electric generator brake release control processing means performs the electric generator brake release control processing and releases the electric generator brake B (step S16-2).

However, when the above electric generator brake B is released, the engine stopping control processing means stops fuel injection and ignition in the engine 11 (step S16-3) and sets the throttle aperture θ to 0 [%] (step S16-4).

Subsequently, the engine stopping control processing means reads the ring gear rotating speed NR and determines the electric generator target rotating speed NG* using the rotating speed relation formula (1) on the basis of the ring gear rotating speed NR and the engine target rotating speed NE* (0 [rpm]) (step S16-5). After the electric generator controller 47 performs the electric generator rotating speed control processing of FIG. 18 (step S16-6), the drive motor controller 49 calculates the drive shaft torque TR/OUT (step S16-7), determines the drive motor target torque TM* (step S16-8) and performs the drive motor control processing (step S16-9) as executed in steps S25 to S27.

The electric generator controller 47 judges whether the engine rotating speed NE is a stoppage rotating speed NEth2 or less (step S16-10). When the engine rotating speed NE is the stoppage rotating speed NEth2 or less (step S16-10 yes), the electric generator controller 47 stops switching with respect to the electric generator 16 and shuts down the electric generator 16 (step S16-11) and processing returns to the point from which the subroutine was started. Conversely, if the engine rotating speed NE is greater than the stoppage rotating speed, NEth2 (step S16-10 no), the processing returns to step S16-5.

Figure 20:
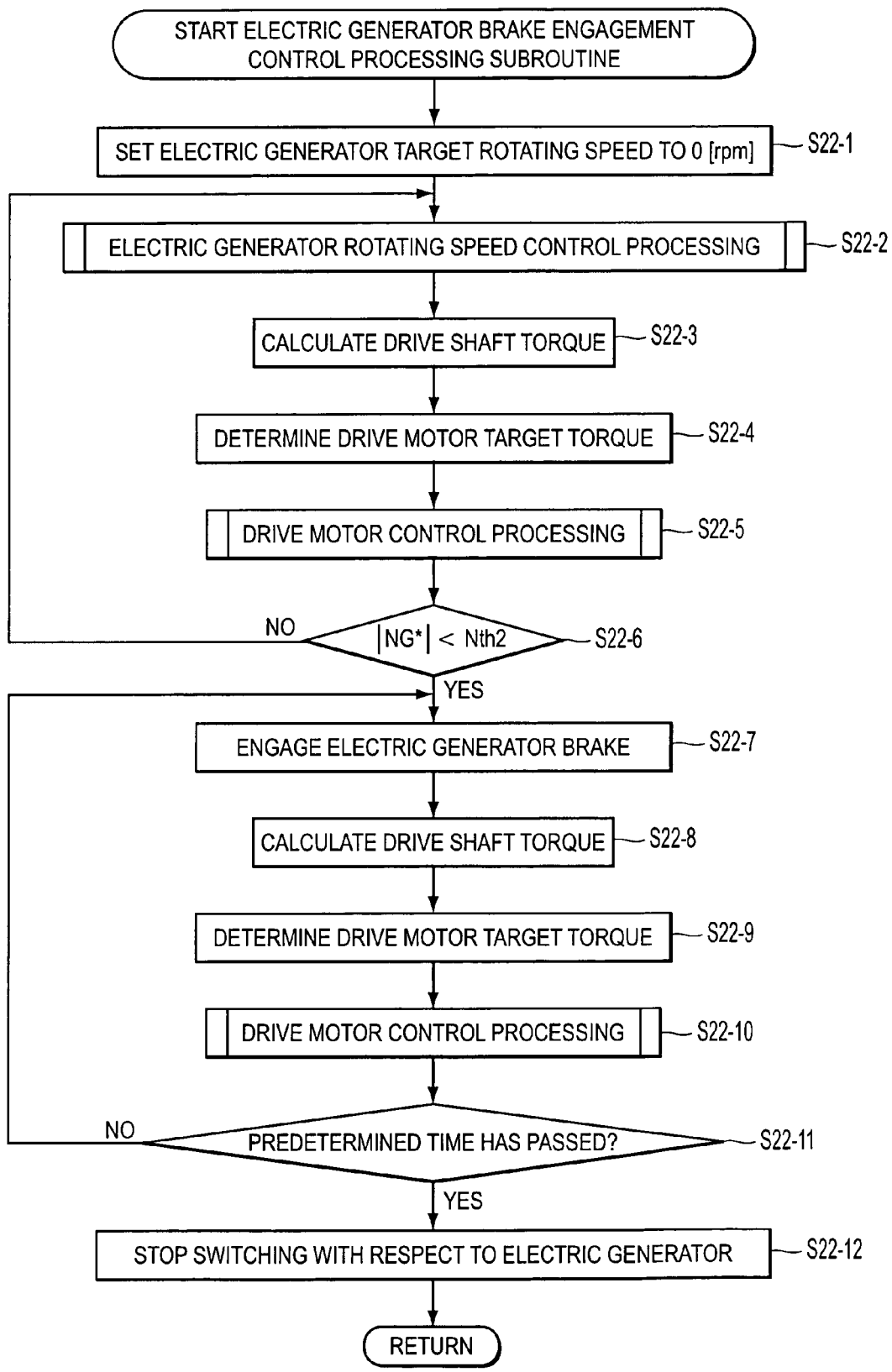
FIG. 20 shows a subroutine of electric generator brake engagement control processing in the first form of the invention.

Now, the subroutine of the electric generator brake engagement control processing found in the step S22 of FIG. 9 will be explained using FIG. 20.

First, the electric generator brake engagement control processing means changes an electric generator brake request for requesting the engagement of the electric generator brake B (FIG. 6) from OFF to ON, and sets the electric generator target rotating speed NG* to 0 [rpm] (step S22-1). After the electric generator controller 47 performs the electric generator rotating speed control processing of FIG. 18 (step S22-2), the drive motor controller 49 calculates the drive shaft torque TR/OUT (step S22-3), determines the drive motor target torque TM* (step S22-4) and performs the drive motor control processing (step S22-5) as executed in steps S25 to S27.

Next, the electric generator brake engagement control processing means judges whether the absolute value of the electric generator rotating speed NG is smaller than a predetermined second rotating speed Nth2 (e.g., 100 [rpm]) (step S22-6). When the absolute value of the electric generator rotating speed NG is smaller than the second rotating speed Nth2 (step S22-6 yes), the electric generator brake B is engaged (step S22-7). Subsequently, as executed in steps S25 to S27, the drive motor controller 49 calculates the drive shaft torque TR/OUT (step S22-8), determines the drive motor target torque TM* (step S22-9), and performs the drive motor control processing (step S22-10).

When a predetermined time has then passed in the engaging state of the electric generator brake B (step S22-11 yes), the electric generator brake engagement control processing means stops the switching with respect to the electric generator 16 and shuts down the electric generator 16 (step S22-12). Processing then returns to where the subroutine was called.

Further, in step S22-6, when it is judged the absolute value of the electric generator rotating speed NG is greater than the second rotating speed Nth2, processing returns to step S22-2 and in step S22-11, when it is judged the predetermined time has not passed processing is returned to the step S22-7.

Figure 21:
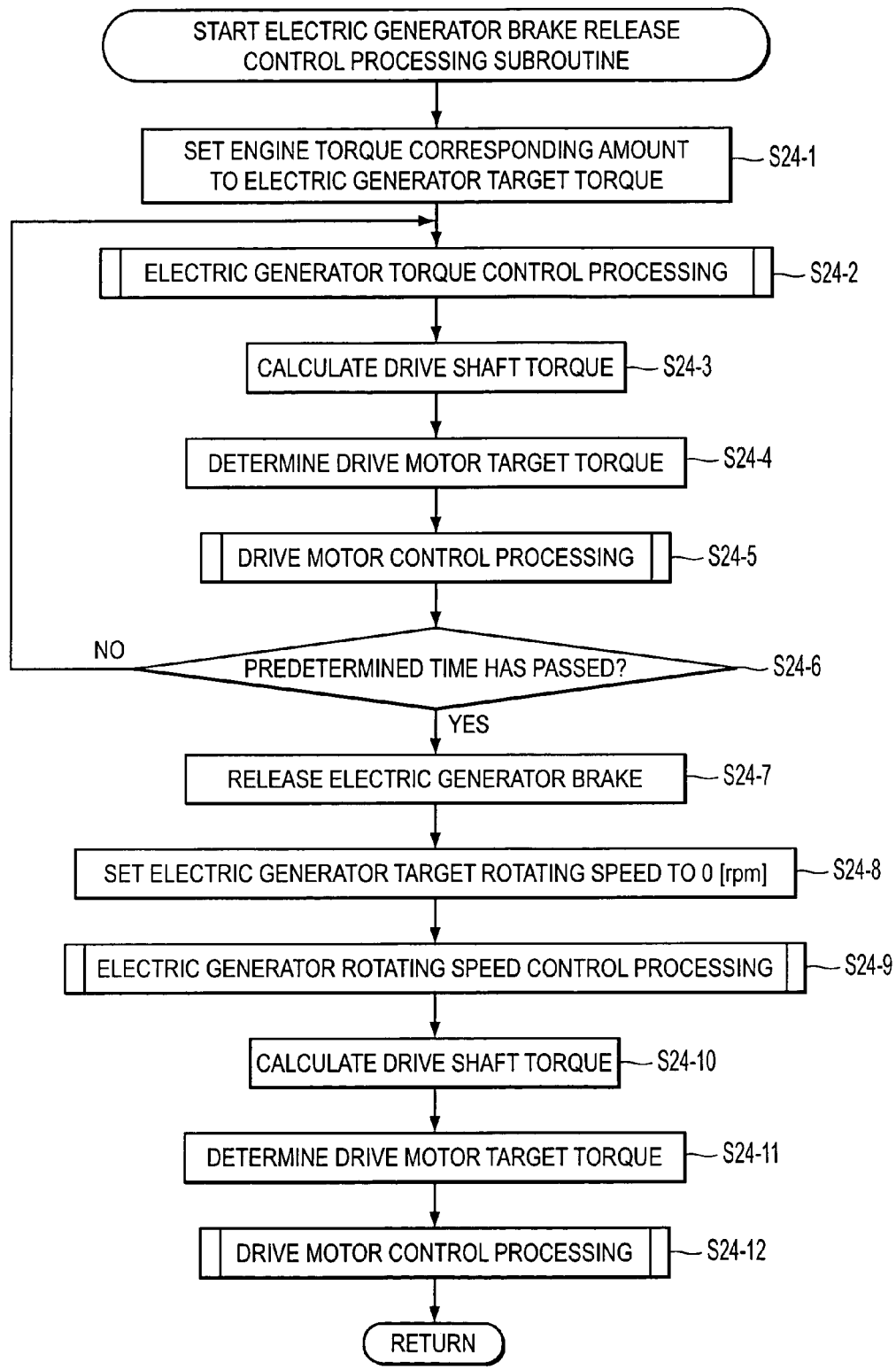
FIG. 21 shows a subroutine of electric generator brake release control processing in the first form of the invention.

The subroutine of the electric generator brake release control processing in step S24 of FIG. 9 and step S16-2 of FIG. 19 will be explained using FIG. 21.

While the electric generator brake B (FIG. 6) is engaged in the electric generator brake engagement control processing, a predetermined engine torque TE is applied to the rotor 21 of the electric generator 16 as a reaction force. Accordingly, when the electric generator brake B is simply released, the electric generator torque TG and the engine torque TE are greatly changed as the engine torque TE is transmitted to the rotor 21, thereby generating a shock.

Therefore, in the above engine controller 46, the engine torque TE transmitted to the above rotor 21 is calculated. The electric generator brake release control processing means reads the torque corresponding to the calculated engine torque TE, i.e., an engine torque corresponding amount, and sets this engine torque corresponding amount as the electric generator target torque TG* (step S24-1). Subsequently, after the electric generator torque control processing means performs the electric generator torque control processing of FIG. 16 (step S24-2), the drive motor controller 49 calculates the drive shaft torque TR/OUT (step S24-3), determines the drive motor target torque TM* (step S24-4) and performs the drive motor control processing as executed (step S24-5) in steps S25 to S27.

When a predetermined time has passed after the electric generator torque control processing is started (step S24-6 yes), the electric generator brake release control processing means releases the electric generator brake B (step S24-7) and sets the electric generator target rotating speed NG* to 0 [rpm] (step S24-8). Thereafter, the electric generator rotating speed control means performs the electric generator rotating speed control processing of FIG. 18 (step S24-9). Subsequently, as executed in steps S25 to S27, the drive motor controller 49 calculates the drive shaft torque TR/OUT (step S24-10), determines the drive motor target torque TM* (step S24-11), and performs the drive motor control processing (step S24-12) and processing returns to the point where the subroutine was called. Further, when step S24-6 is no, processing returns to step S24-2. The engine torque corresponding amount is calculated by learning the torque ratio of the electric generator torque TG with respect to the engine torque TE.

Figure 22:
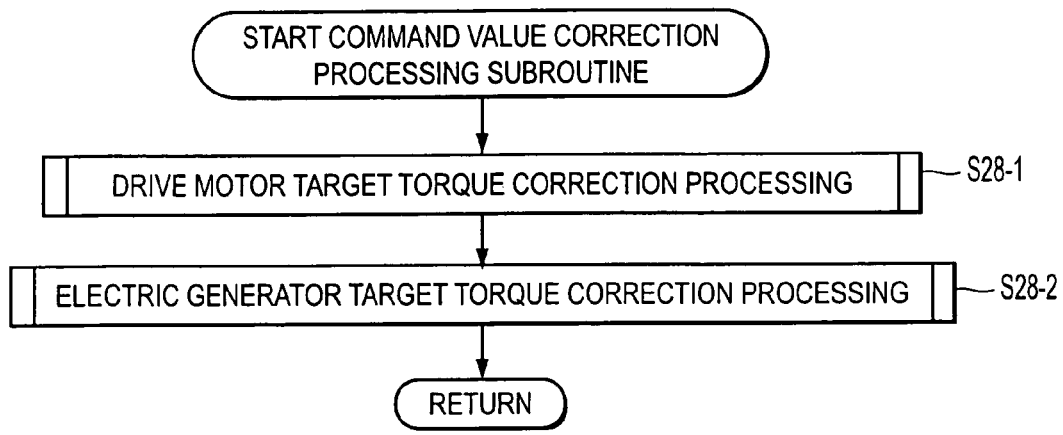
FIG. 22 shows a subroutine of command value correction processing in the first form of the invention.

The subroutine for the command value correction processing shown in the step S28 of FIG. 9 will next be explained using FIG. 22.

Figure 23:
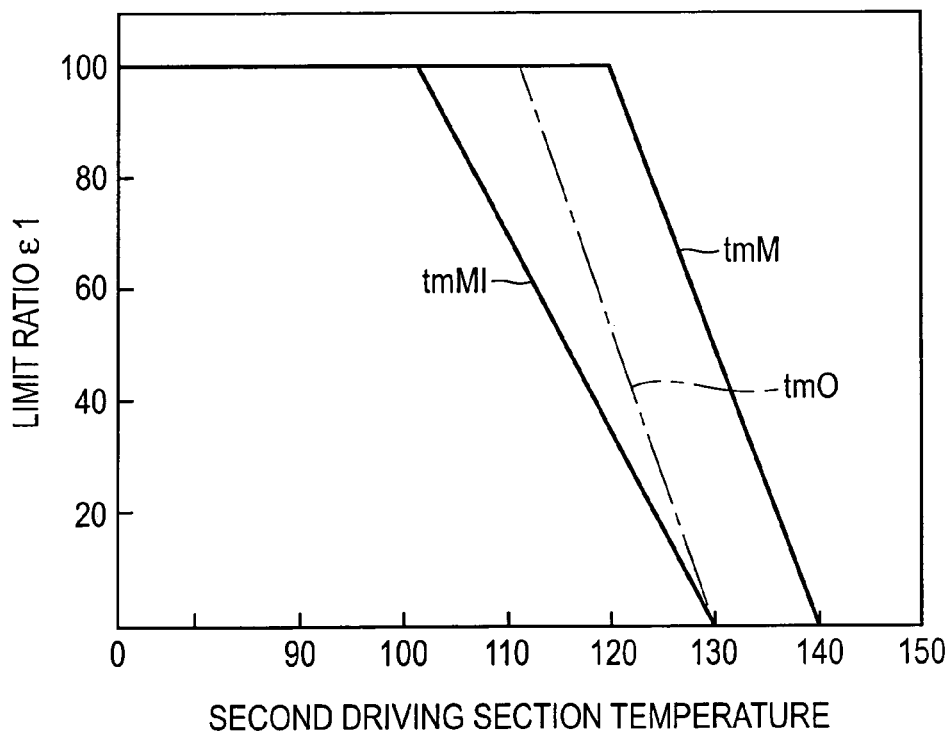
FIG. 23 illustrates a limit ratio map for the drive motor in the first form of the invention.

First, in step S28-1, the drive motor target torque correction processing means, as an electrically operated machine target torque correction processing means of a command value correction processing means, performs drive motor target torque correction processing as electrically operated machine target torque correction processing and corrects the drive motor target torque TM*. Therefore, the limit ratio calculation processing means 91 (FIG. 1) of the drive motor target torque correction processing performs limit ratio calculation processing and reads the temperature tmM. The limit ratio calculation processing means 91 also refers to the limit ratio map (FIG. 23 where the second driving section temperature is set on the axis of abscissa and a limit ratio ε1 is set on the axis of ordinate) for the drive motor 25 recorded to the recorder of the vehicle controller 51 (FIG. 6), and reads and calculates the limit ratio ε1 corresponding to the temperature tmM. The limit ratio ε1 is shown by percentage and is set corresponding to the temperature tmM to limit the drive motor torque TM. As shown in FIG. 23, the limit ratio ε1 can be also set to correspond to temperatures tmMI, tmO, etc. in addition to the temperature tmM.

When the drive motor inverter voltage VM and the drive motor rotating speed NM are known, the drive motor maximum torque TMmax is set to correspond to the drive motor inverter voltage VM and the drive motor rotating speed NM can be read. The drive motor maximum torque TMmax is changed as shown by a line LM in FIGS. 24 to 26 (where the drive motor rotating speed NM is set on the axis of abscissa and the drive motor maximum torque TMmax and the drive motor limit torque TMi are set on the axis of ordinate) and has a constant value in a rotation area in which the drive motor rotating speed NM is lower than a predetermined changing point (e.g., 1250 [rpm]), i.e., a predetermined low speed rotation area. In a rotation area equal to or greater than the changing point, i.e., in intermediate and high speed rotation areas, as the drive motor rotating speed NM is raised, the drive motor maximum torque TMmax is reduced while the changing ratio is gradually reduced. It is also possible to use the battery voltage VB instead of the drive motor inverter voltage VM and read the drive motor maximum torque TMmax set to correspond to the battery voltage VB and the drive motor rotating speed NM.

Figure 24:
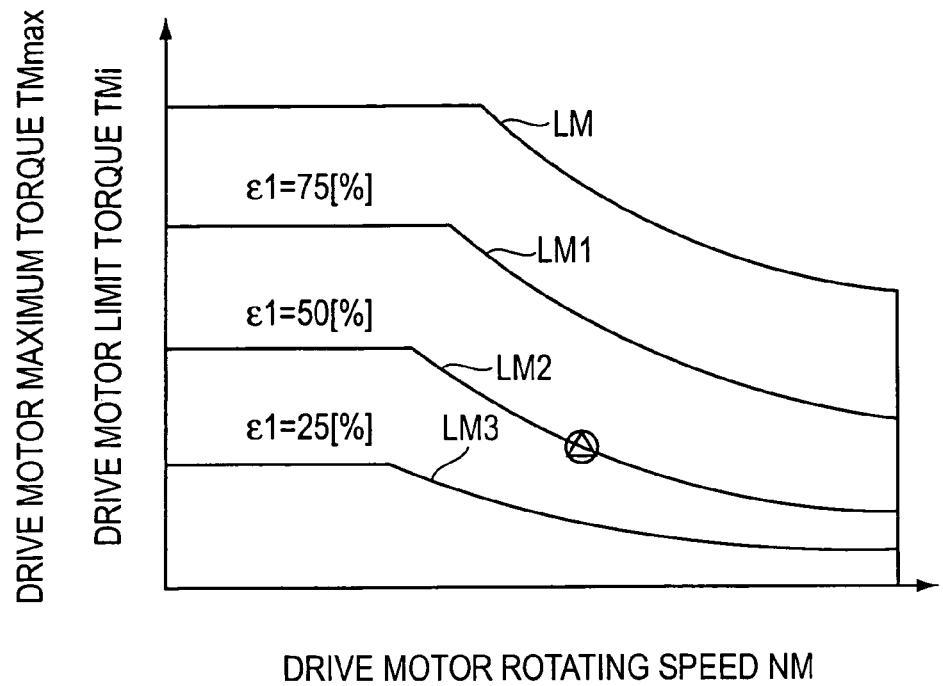
FIG. 24 illustrates a drive motor limit torque map in the first form of the invention.
Figure 25:
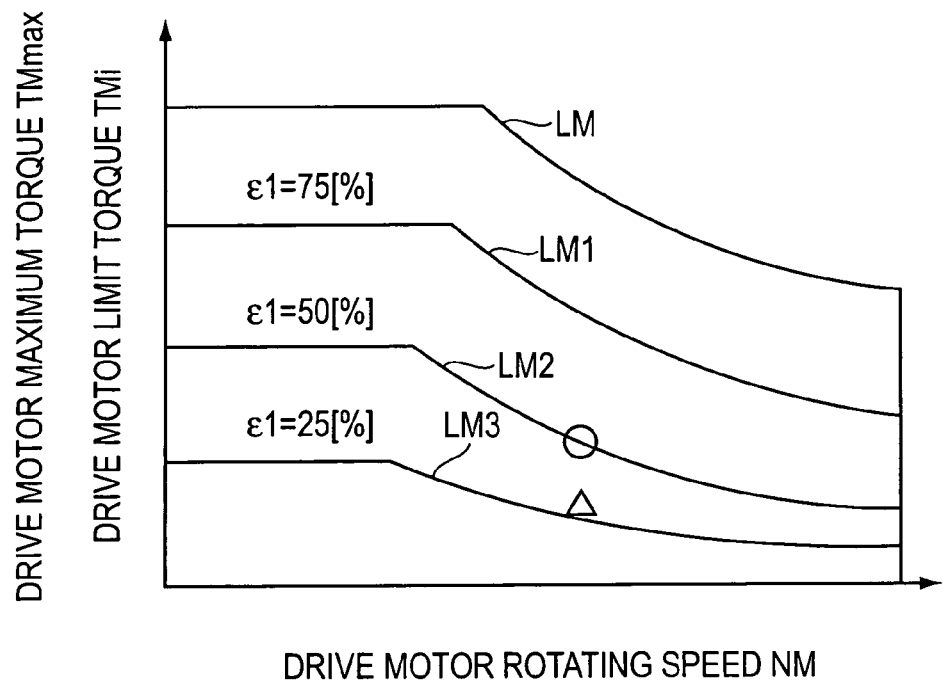
FIG. 25 is a second illustration of the drive motor limit torque map in the first form of the invention.
Figure 26:
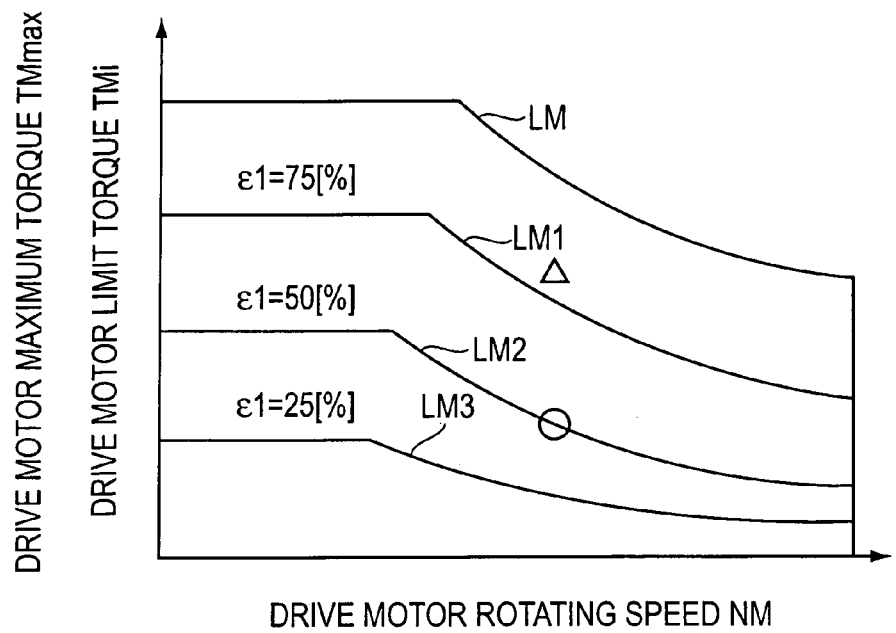
FIG. 26 is a third illustration of the drive motor limit torque map in the first form of the invention.

Accordingly, drive motor limit torque TMi (i=1, 2, - - - ), as shown by lines LM1 to LM3 in FIGS. 24 to 26, can be calculated by variously changing the limit ratio $\epsilon 1$ and multiplying the drive motor maximum torque TMmax by the limit ratio $\epsilon 1$. Therefore, in this form of the invention, as shown in FIGS. 24 to 26, the relationship of the drive motor rotating speed NM and the drive motor limit torque TMi is recorded to the recorder of the vehicle controller 51 as a drive motor limit torque map for the drive motor 25.

Namely, when the drive motor rotating speed NM and the limit ratio $\epsilon 1$ are read, the limit torque calculation processing means 93 of the drive motor target torque correction processing means performs limit torque calculation processing and refers to the drive motor limit torque map and calculates the drive motor limit torque TMi corresponding to the drive motor rotating speed NM and the limit ratio $\epsilon 1$.

Subsequently, a correcting torque calculation processing means of the drive motor target torque correction processing means performs correcting torque calculation processing and reads the drive motor target torque TM* and the drive motor limit torque TMi. The correcting torque calculation processing means of the drive motor target torque correction processing means then compares the drive motor target torque TM* and the drive motor limit torque TMi. When the drive motor target torque TM* is greater than the drive motor limit torque TMi, the drive motor limit torque TMi is set to the drive motor target torque TM* after the correction. In contrast to this, when the drive motor target torque TM* is the drive motor limit torque TMi or less, the drive motor target torque TM* is set to the drive motor target torque TM* after the correction.

For example, when the limit ratio $\epsilon 1$ is 50 [%], the drive motor limit torque TM2 has the value of a predetermined position on the line LM2 in FIGS. 24 to 26, e.g., the position shown by ○. However, as shown in FIG. 24, when the drive motor target torque TM* has the value of the position shown by Δ and is equal to the drive motor limit torque TM2, the correcting torque calculation processing means sets the drive motor target torque TM* to the drive motor target torque TM* after the correction.

Further, as shown in FIG. 25, when the drive motor target torque TM* has the value of the position shown by Δ and is smaller than the drive motor limit torque TM2, the correcting torque calculation processing means sets the drive motor target torque TM* to the drive motor target torque TM* after the correction. Further, as shown in FIG. 26, when the drive motor target torque TM* has the value of the position shown by Δ and is greater than the drive motor limit torque TM2, the correcting torque calculation processing means sets the drive motor limit torque TM2 to the drive motor target torque TM* after the correction.

Thus, when the temperature tmM of the drive motor 25 is raised, the drive motor torque TM is limited by the limit ratio $\epsilon 1$ corresponding to the temperature tmM. Accordingly, it is possible to prevent the characteristics of the drive motor 25 from being reduced.

Further, when the drive motor target torque TM* is the drive motor limit torque TMi or less, the drive motor target torque TM* is set to the drive motor target torque TM* after the correction. Accordingly, the drive motor torque TM can be properly generated and the driver request output PD can be properly generated.

Figure 27:
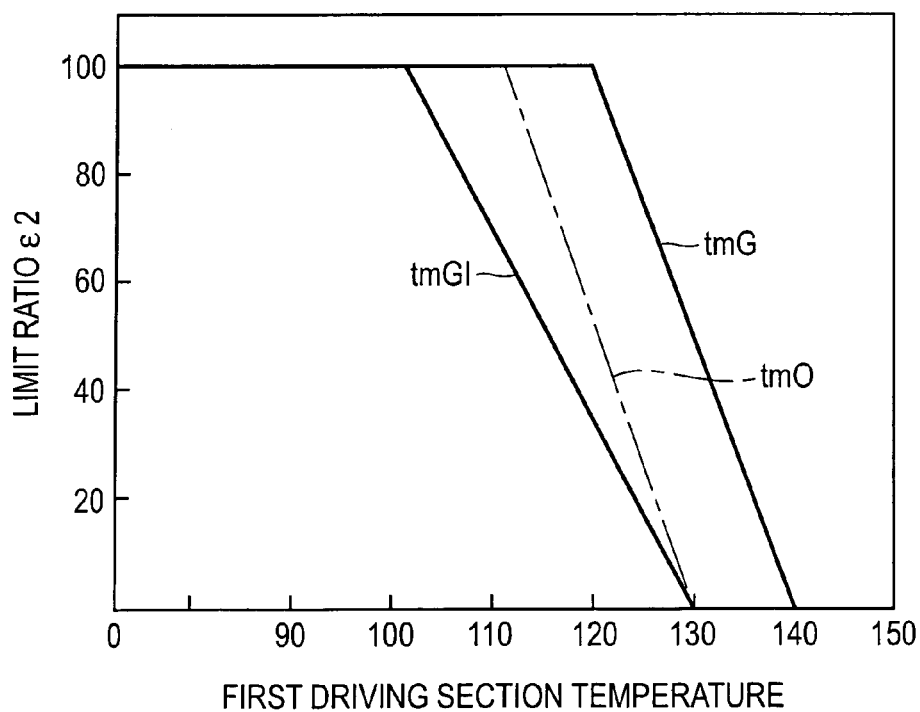
FIG. 27 illustrates a limit ratio map for the electric generator in the first form of the invention.

Subsequently, an electric generator target torque correction processing means as the electrically operated machine target torque correction processing means of the command value correction processing means performs electric generator target torque correction processing as the electrically operated machine target torque correction processing and corrects the electric generator target torque TG* (step S28-2). Therefore, the limit ratio calculation processing means 91 of the electric generator target torque correction processing performs the limit ratio calculation processing and reads the temperature tmG. The limit ratio calculation processing means 91 further refers to a limit ratio map for the electric generator 16 recorded to the recorder of the vehicle controller 51, as shown in FIG. 27 (where the first driving section temperature is set on the axis of abscissa and a limit ratio $\epsilon 2$ is set on the axis of ordinate), and reads and calculates the limit ratio $\epsilon 2$ corresponding to the temperature tmG. The limit ratio $\epsilon 2$ is shown by percentage and is set to correspond to the temperature tmG so as to limit the electric generator torque TG.

As shown in FIG. 27, the limit ratio $\epsilon 2$ can be also set to correspond to temperatures tmGI, tmO, etc. in addition to the temperature tmG.

When the electric generator inverter voltage VG and the electric generator rotating speed NG are known, it is possible to read the electric generator maximum torque TGmax set to correspond to the electric generator inverter voltage VG and the electric generator rotating speed NG. Similar to the drive motor maximum torque TMmax, the electric generator maximum torque TGmax has a constant value in a rotation area in which the electric generator rotating speed NG is lower than a predetermined changing point (e.g., 1250 [rpm]), i.e., a low speed rotation area. In contrast to this, in a rotation area equal to or greater than the changing point, i.e., in intermediate and high speed rotation areas, as the electric generator rotating speed NG is raised, the electric generator maximum torque TGmax is reduced while the changing ratio is gradually reduced. The electric generator maximum torque TGmax set to correspond to the battery voltage VB and the electric generator rotating speed NG can be read by using the battery voltage VB instead of the electric generator inverter voltage VG.

Accordingly, the electric generator limit torque TGi (i=1, 2, - - - ) can be calculated by variously changing the limit ratio $\epsilon 2$ and multiplying the electric generator maximum torque TGmax by the limit ratio $\epsilon 2$. Therefore, the relationship of the electric generator rotating speed NG and the electric generator limit torque TGi is recorded to the recorder of the vehicle controller 51 as an electric generator limit torque map for the electric generator 16.

Namely, when the electric generator rotating speed NG and the limit ratio $\epsilon 2$ are read, the limit torque calculation processing means 93 of the electric generator target torque correction processing means performs limit torque calculation processing and refers to the electric generator limit torque map and calculates the electric generator limit torque TGi corresponding to the electric generator rotating speed NG and the limit ratio $\epsilon 2$.

Subsequently, the correcting torque calculation processing means of the electric generator target torque correction processing means performs the correcting torque calculation processing and reads the electric generator target torque TG* and the electric generator limit torque TGi, and then compares the electric generator target torque TG* and the electric generator limit torque TGi. When the electric generator target torque TG* is greater than the electric generator limit torque TGi, the correcting torque calculation processing means of the electric generator target torque correction processing means sets the electric generator limit torque TGi to the electric generator target torque TG* after the correction. In contrast to this, when the electric generator target torque TG* is the electric generator limit torque TGi or less, the correcting torque calculation processing means of the electric generator target torque correction processing means sets the electric generator target torque TG* to the electric generator target torque TG* after the correction.

Thus, when the temperature tmG of the electric generator 16 is raised, the electric generator torque TG is limited by the limit ratio $\epsilon 2$ corresponding to the temperature tmG. Accordingly, it is possible to prevent the characteristics of the electric generator 16 from being reduced.

Further, when the electric generator target torque TG* is the electric generator limit torque TGi or less, the electric generator target torque TG* is set to the electric generator target torque TG* after the correction. Accordingly, the electric generator torque TG can be properly generated and the driver request output PD can be properly generated.

The electrically operated machine maximum torque is derived from the drive motor maximum torque TMmax and the electric generator maximum torque TGmax. The electrically operated machine limit torque is derived from the drive motor limit torque TMi and the electric generator limit torque TGi. After step S28-2, processing returns to where the subroutine was called.

For example, in the case of the drive motor 25, the load applied to the drive motor 25 is small in the low speed rotation area. Accordingly, the rise in temperatures tmM, tmMI, tmO, etc. are restrained as the drive motor 25 is operated. Therefore, a second form of the invention for relaxing the limit of the drive motor torque TM in a case belonging to the low speed rotation area will be explained.

Figure 28:
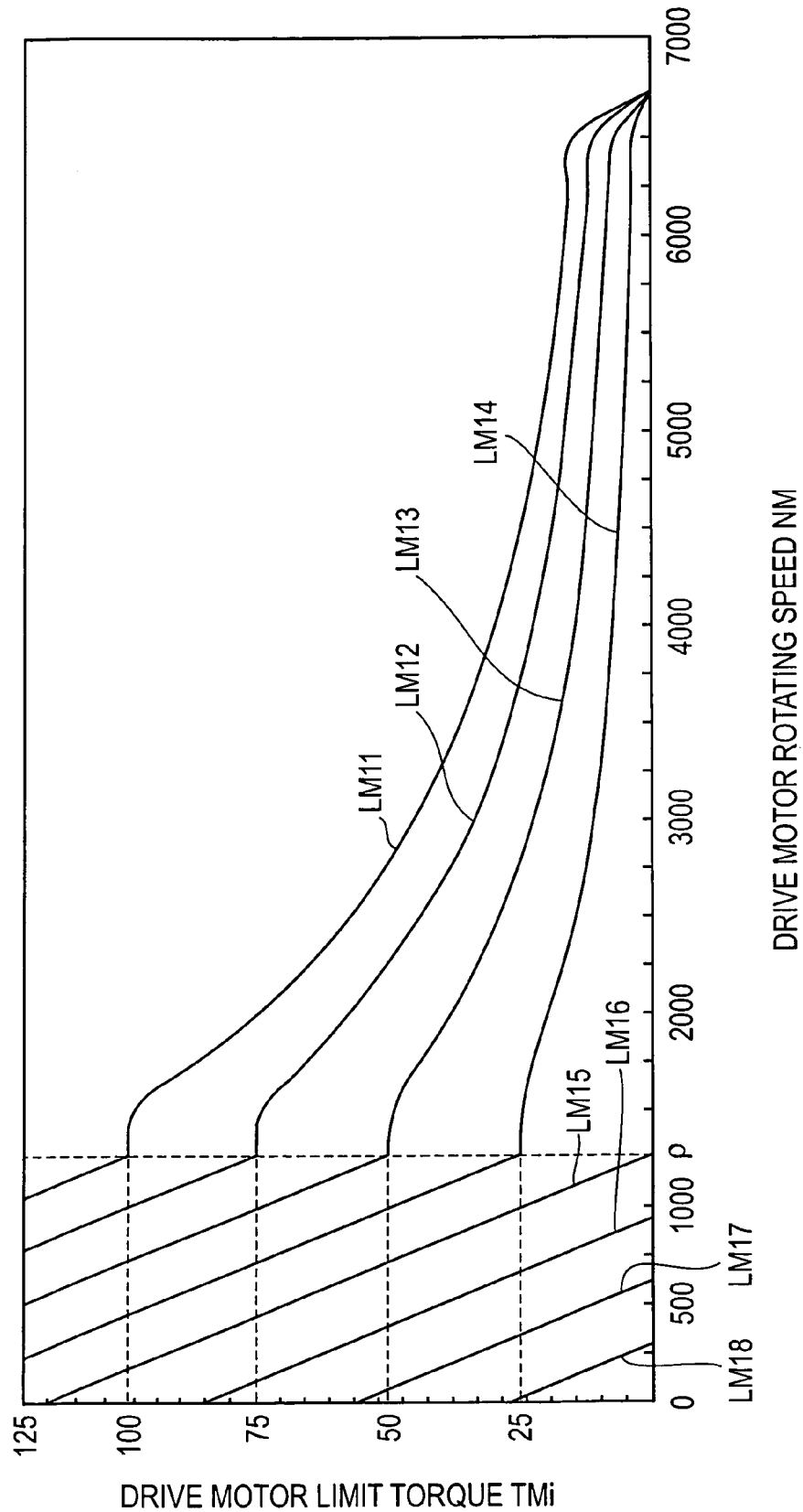
FIG. 28 illustrates a drive motor limit torque map in a second form of the invention.

FIG. 28 shows a drive motor limit torque map in the second form of the invention. In the figure, the drive motor rotating speed NM is set on the axis of abscissa and the drive motor limit torque TMi is set on the axis of ordinate.

In this case, as shown by lines L11 to L18, a changing point p is set to a point at which the value of the drive motor rotating speed NM is 1250 [rpm]. In the low speed rotation area, lower than the changing point ρ, the drive motor limit torque TMi (i=11, 12, - - - ) is linearly changed and slantingly rises from the changing point ρ toward lower rotating speeds. In the intermediate and high speed rotation areas of the changing point ρ, as the drive motor rotating speed NM is raised, the drive motor limit torque TMi is reduced while the changing ratio is gradually reduced.

Thus, when the drive motor rotating speed NM is in the low speed rotation area, the drive motor limit torque TMi is increased as the drive motor rotating speed NM is reduced, and the drive motor limit torque TMi is reduced as the drive motor rotating speed NM is raised. Thus, the limit of the drive motor torque TM is relaxed. Namely, the limit ratio $\epsilon 1$ is gradually relaxed such that the drive motor torque TM approaches the drive motor maximum torque TMmax in a constant changing ratio. Accordingly, the drive motor torque TM can be further adequately generated in the low speed rotation area, and the driver request output PD can be further adequately generated.

In this form, the limit of the drive motor torque TM is relaxed in the low speed rotation area. However, the limit of the electric generator torque TG can be also relaxed in the low speed rotation area.

The invention is not limited to the above forms, but can be variously modified on the basis of the spirit of the invention. These modifications are not excluded from the scope of the invention.

As explained above in detail, in accordance with the invention, an electrically operated vehicle driving controller comprises an electrically operated machine driving section for operating an electrically operated machine; a driving section temperature detecting section for detecting the driving section temperature of the electrically operated machine driving section; limit ratio calculation processing means for calculating a limit ratio for limiting the torque of the electrically operated machine on the basis of the driving section temperature; rotating speed calculation processing means for calculating the rotating speed of the electrically operated machine; and limit torque calculation processing means for calculating electrically operated machine limit torque corresponding to electrically operated machine maximum torque set to correspond to the rotating speed on the basis of the limit ratio.

In this case, because the torque of the electrically operated machine is limited in the limit ratio corresponding to the temperature of the electrically operated machine, it is possible to prevent the characteristics of the electrically operated machine from being reduced.

Further, because the electrically operated machine limit torque corresponding to the electrically operated machine maximum torque is calculated on the basis of the limit ratio, the torque of the electrically operated machine can be adequately generated and the driver request output can be adequately generated.

In another electrically operated vehicle driving controller of the invention, the limit ratio is further gradually relaxed such that the torque of the electrically operated machine approaches the electrically operated machine maximum torque when the rotating speed belongs to a predetermined low speed rotation area.

In this case, when the rotating speed belongs to the predetermined low speed rotation area, the limit ratio is gradually relaxed such that the torque of the electrically operated machine approaches the electrically operated machine maximum torque. Accordingly, in the low speed rotation area, the torque of the electrically operated machine can be further adequately generated and the driver request output can be further adequately generated.

What is claimed is:

1. An electrically operated vehicle driving controller, comprising:
    an electrically operated machine driving section for operating an electrically operated machine;
    a driving section temperature detecting section for detecting the driving section temperature of the electrically operated machine driving section;
    limit ratio calculation processing means for calculating a limit ratio for limiting the torque of the electrically operated machine on the basis of the driving section temperature;
    rotating speed calculation processing means for calculating the rotating speed of the electrically operated machine;
    limit torque calculation processing means for calculating an electrically operated machine limit torque on the basis of an electrically operated machine maximum torque set correspondingly to the rotating speed and the limit ratio;
    electrically operated machine target torque calculation processing means for calculating an electrically operated machine target torque showing a target value of the electrically operated machine torque; and
    correcting torque calculation processing means for correcting the electrically operated machine target torque on the basis of the electrically operated machine limit torque when the electrically operated machine target torque is greater than the electrically operated machine limit torque.

2. The electrically operated vehicle driving controller according to claim 1, wherein the limit ratio is gradually relaxed such that the torque of the electrically operated machine approaches the electrically operated machine maximum torque when the rotating speed belongs to a predetermined low speed rotation area.

3. The electrically operated vehicle driving controller according to claim 2, wherein the limit ratio is relaxed such that the torque of the electrically operated machine approaches the electrically operated machine maximum torque in a constant changing ratio when the rotating speed belongs to the predetermined low speed rotation area.

4. The electrically operated vehicle driving controller according to claim 3, wherein the electrically operated machine limit torque is increased as the rotating speed is reduced, and is decreased as the rotating speed is increased.

5. The electrically operated vehicle driving controller according to claim 2, wherein the electrically operated machine limit torque is increased as the rotating speed is reduced, and is decreased as the rotating speed is increased.

6. The electrically operated vehicle driving controller according to claim 1, wherein the limit ratio is relaxed such that the torque of the electrically operated machine approaches the electrically operated machine maximum torque in a constant changing ratio when the rotating speed belongs to a predetermined low speed rotation area.

7. The electrically operated vehicle driving controller according to claim 6, wherein the electrically operated machine limit torque is increased as the rotating speed is reduced, and is decreased as the rotating speed is increased.

8. The electrically operated vehicle driving controller according to claim 1, wherein the electrically operated machine limit torque is increased as the rotating speed is reduced, and is decreased as the rotating speed is increased.

9. The electrically operated vehicle controller of claim 1, wherein the correcting torque calculation processing means make the electrically operated machine target torque to equal the electrically operated machine limit torque when the electrically operated machine target torque is greater than the electrically operated machine limit torque.

10. The electrically operated vehicle driving controller according to claim 1, wherein the electrically operated machine maximum torque is set by the rotating speed and a voltage supplied to the electrically operated machine driving section.

11. An electrically operated vehicle driving control method comprising:

detecting a driving section temperature of an electrically operated machine driving section for operating an electrically operated machine;

calculating a limit ratio for limiting the torque of the electrically operated machine on the basis of the driving section temperature;

calculating the rotating speed of the electrically operated machine;

calculating an electrically operated machine limit torque on the basis of an electrically operated machine maximum torque set to correspond to the rotating speed and the limit ratio;

calculating an electrically operated machine target torque showing a target value of the electrically operated machine torque; and correcting the electrically operated machine target torque on the basis of the electrically operated machine limit torque when the electrically operated machine target torque is greater than the electrically operated machine limit torque.

12. The electrically operated vehicle driving method according to claim 11, wherein the electrically operated machine limit torque is increased as the rotating speed is reduced, and is decreased as the rotating speed is increased.

13. A computer readable storage medium having stored thereon a computer program that, when executed, causes a computer to perform at least the steps of:

calculating a limit ratio for limiting the torque of an electrically operated machine on the basis of a driving section temperature of an electrically operated machine driving section for operating the electrically operated machine;

calculating the rotating speed of the electrically operated machine;

calculating an electrically operated machine limit torque on the basis of an electrically operated machine maximum torque set to correspond to the rotating speed and the limit ratio;

calculating an electrically operated machine target torque showing a target value of the electrically operated machine torque; and correcting the electrically operated machine target torque on the basis of the electrically operated machine limit torque when the electrically operated machine target torque is greater than the electrically operated machine limit torque.

* * * * *